(12) United States Patent
Yu et al.

(10) Patent No.: US 11,951,612 B2
(45) Date of Patent: Apr. 9, 2024

(54) SOFT PICKING TOOLS FOR PICK AND PLACE ROBOTIC SYSTEMS

(71) Applicant: XYZ Robotics Global Inc., Grand Cayman (KY)

(72) Inventors: Kuan-Ting Yu, Natick, MA (US); Thanh Nha Nguyen, Somerville, MA (US)

(73) Assignee: XYZ Robotics Global Inc., Grand Cayman (KY)

( * ) Notice: Subject to any disclaimer, the term of this patent is extended or adjusted under 35 U.S.C. 154(b) by 0 days.

(21) Appl. No.: 18/348,377

(22) Filed: Jul. 7, 2023

(65) Prior Publication Data

US 2023/0356415 A1 Nov. 9, 2023

Related U.S. Application Data

(63) Continuation of application No. PCT/US2022/070008, filed on Jan. 4, 2022.

(60) Provisional application No. 63/134,972, filed on Jan. 8, 2021.

(51) Int. Cl.
  *B25J 15/12* (2006.01)
  *B65G 47/90* (2006.01)

(52) U.S. Cl.
  CPC .......... *B25J 15/12* (2013.01); *B65G 47/905* (2013.01)

(58) Field of Classification Search
  CPC ........ B25J 15/12; B25J 15/024; B65G 47/905
  See application file for complete search history.

(56) References Cited

U.S. PATENT DOCUMENTS

| | | | |
|---|---|---|---|
| 10,118,301 B2 * | 11/2018 | Lessing | B25J 15/0608 |
| 2002/0157388 A1 | 10/2002 | Seto et al. | |
| 2014/0109560 A1 | 4/2014 | Ilievski et al. | |
| 2017/0203443 A1 | 7/2017 | Lessing et al. | |
| 2020/0298420 A1 | 9/2020 | Wang et al. | |

FOREIGN PATENT DOCUMENTS

| | | | | |
|---|---|---|---|---|
| CN | 106003133 A | * | 10/2016 | |
| CN | 111319060 A | * | 6/2020 | |
| CN | 111360866 A | * | 7/2020 | B25J 15/12 |
| CN | 112589828 A | * | 4/2021 | B25J 15/12 |
| CN | 113427517 A | * | 9/2021 | |

* cited by examiner

*Primary Examiner* — Stephen A Vu
(74) *Attorney, Agent, or Firm* — American Patent Agency PC; Daniar Hussain; Stephen M. Hou

(57) ABSTRACT

Soft picking tools for a pick and place robotic system are disclosed. A soft picking tool includes a body made of an integrated piece. The body includes stiff fingers located on a distal end of the body. The body also includes a portion of a soft-walled cavity configured to be deformed by application of a positive or negative pressure in the soft-walled cavity, leading to a motion of the stiff fingers, from a rest position, towards or away from a medial axis of the soft picking tool. The soft picking tool also includes one or more fingertips, where at least one of the stiff fingers includes a fingertip embedded on its distal end. The single-piece design and fingertips enable increased robustness, a reduced footprint, large gripping and spreading forces, and more efficient cluttered and flush grasping.

22 Claims, 19 Drawing Sheets

SOFT PICKING TOOLS FOR PICK AND PLACE ROBOTIC SYSTEMS

FIELD OF THE INVENTION

Embodiments of the present invention are in the field of robotic systems that use artificial intelligence, computer vision, and/or mechanical systems to pick, sort, and place objects, and pertain particularly to soft picking tools for a pick, sort, and place robotic system.

BACKGROUND OF THE INVENTION

The statements in the background of the invention are provided to assist with understanding the invention and its applications and uses, and may not constitute prior art.

There are several approaches that have been used to design soft picking tools for a sort and place robotic system to pick objects of varying shapes, dimensions, weights, materials, and levels of fragility. However, many of these approaches either require a large footprint or do not enable firm fingers, leading to picking tools that are not adequate for cluttered or flush grasping. For example, a conventional approach is to use three fingers that are affixed to a gripper body and that exhibit radial symmetry about the body's medial axis. However, this approach has several shortcomings. First, the use of three affixed fingers disposed in radial symmetry about the medial axis results in a large footprint that is not adequate for cluttered grasping, particularly when the gripper targets objects with widely varying dimensions, such as elongated objects. A large footprint also hinders grasping objects that are flushed against a wall (i.e., flush grasping), particularly in soft grippers where the fingertips are not hard or stiff enough to penetrate between a target object and the wall. In addition, grippers having fingers that are separate, affixed components are less robust in dynamic applications where speed is required.

Therefore, it would be an advancement in the state of the art to provide an improved soft picking tool for a pick, sort, and place robotic system.

It is against this background that the present invention was developed.

BRIEF SUMMARY OF THE INVENTION

The present invention relates to a soft picking tool for a pick, sort, and place robotic system, where a portion of a body and fingers are integrated, exhibiting increased robustness and a reduced footprint, combined with fingertips enabling efficient grasping in clutter. The soft picking tool may be controlled by the application of a positive or negative fluidic pressure in a cavity, whose deformations in response to the pressure causes the fingers to move. In addition, asymmetries along the various axes would enable the soft picking tool to remain narrow, thus achieving a device that is physically compact while providing a large gripping or spreading force. Such a picking tool may be extended into tools with multiple sets of fingers.

More specifically, in various embodiments, the present invention is a soft picking tool for a pick and place robotic system, including a body made of an integrated piece, the body including a plurality of stiff fingers located on a distal end of the body, and a portion of a soft-walled cavity configured to be deformed by application of a positive or negative pressure in the soft-walled cavity, leading to a motion of the plurality of stiff fingers, from a rest position, towards or away from a medial axis of the soft picking tool. The soft picking tool also includes one or more embedded fingertips, where at least one of the plurality of stiff fingers includes an embedded fingertip embedded on its distal end. The single-piece design and fingertips enable robustness, a small footprint, a large gripping and spreading force, and more efficient grasping in clutter.

In some embodiments, the soft picking tool further includes an adapter plate that seals the proximal end of the soft-walled cavity, the adapter plate including an adapter plate medial channel, and an embedded mounting ring attaching the body to the adapter plate.

In some embodiments, the soft picking tool further includes a lower part of a tool changer attached to the adapter plate, where the lower part of the tool changer connects to the pick and place robotic system through an upper part of the tool changer, and where the lower part of the tool changer includes a tool changer medial channel aligned with the adapter plate medial channel.

In some embodiments, the body of the soft picking tool has two stiff fingers, where the two stiff fingers are placed along a lateral axis perpendicular to the medial axis of the soft picking tool, and the motion of the two stiff fingers is a rotation around a frontal axis perpendicular to both the lateral axis and the medial axis of the soft picking tool.

In some embodiments, the body, the embedded mounting ring, and the adapter plate of the soft picking tool are narrower along the frontal axis than along the lateral axis.

In some embodiments, the number of and the spatial arrangement of stiff fingers in the plurality of stiff fingers is configured to grip a specifically shaped object.

In some embodiments, the soft-walled cavity is hemispherical. In some embodiments, the soft-walled cavity is paraboloidal. In some embodiments, the soft-walled cavity is ellipsoidal.

In some embodiments, the one or more embedded fingertips are detachable.

In some embodiments, each stiff finger of the plurality of stiff fingers is configured to not touch another stiff finger of the plurality of stiff fingers at any level of pressure applied inside the soft-walled cavity.

In some embodiments, at least one stiff finger of the plurality of stiff fingers is configured to touch another stiff finger of the plurality of stiff fingers at some level of pressure applied inside the soft-walled cavity.

In some embodiments, a plurality of levels of pressure applied inside the soft-walled cavity of the soft picking tool leads to a plurality of corresponding levels of force applied by each of the plurality of stiff fingers on an object.

In some embodiments, the motion of the plurality of stiff fingers of the soft picking tool from the rest position is a gripping motion that occurs only towards the medial axis of the soft picking tool.

In some embodiments, the motion of the plurality of stiff fingers of the soft picking tool from the rest position is a spreading motion that occurs only away from the medial axis of the soft picking tool.

In some embodiments, the soft picking tool further includes an external valve that is configured to maintain a pressure level inside the soft-walled cavity.

In some embodiments, the soft picking tool further includes a sensor for determining information selected from the group consisting of a position of one or more of the plurality of stiff fingers, a position of an object relative to the soft picking tool, and a force level applied by one or more of the plurality of stiff fingers of the soft picking tool.

In some embodiments, the sensor of the soft picking tool is selected from the group consisting of a pressure sensor, a force sensor, a proximity sensor, an electric current sensor, and a camera.

In some embodiments, a pressure sent to the soft picking tool adjusts in response to the information determined from the sensor to maintain a force level applied by one or more of the plurality of stiff fingers of the soft picking tool within a pre-determined force range.

In some embodiments, the pre-determined force range corresponds to gripping an object without damaging the object.

In some embodiments, the soft picking tool further includes a machine learning module for determining information selected from the group consisting of a position of one or more of the plurality of stiff fingers, a position of an object relative to the soft picking tool, and a force level applied by one or more of the plurality of stiff fingers.

In various embodiments, the present invention is a pick and place robotic system including a soft picking tool, the soft picking tool including a body made of an integrated piece, the body including a plurality of stiff fingers located on a distal end of the body, and a portion of a soft-walled cavity configured to be deformed by application of a positive or negative pressure in the soft-walled cavity, leading to a motion of the plurality of stiff fingers, from a rest position, towards or away from a medial axis of the soft picking tool; and one or more embedded fingertips, where at least one of the plurality of stiff fingers includes an embedded fingertip embedded on its distal end.

Other aspects and embodiments of the present invention include the methods and processes including the steps described herein, and also include the processes and modes of operation of the systems and devices described herein. Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

With reference to the figures provided, embodiments of the present invention are now described in detail. In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Context of the Soft Picking Tool within a Robotic System

Figure 1A:
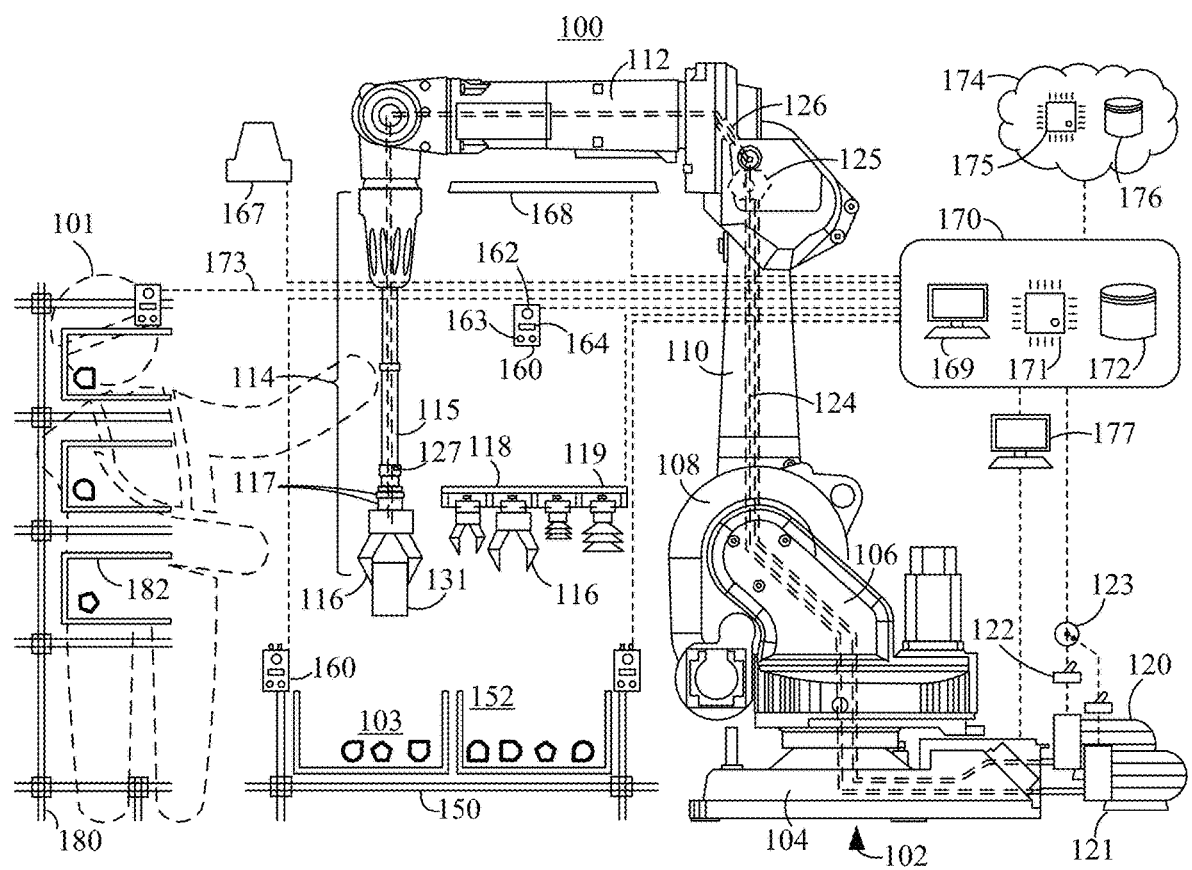
FIGS. 1A, 1B, and 1C show exemplary robotic systems in accordance with some embodiments.
Figure 1B:
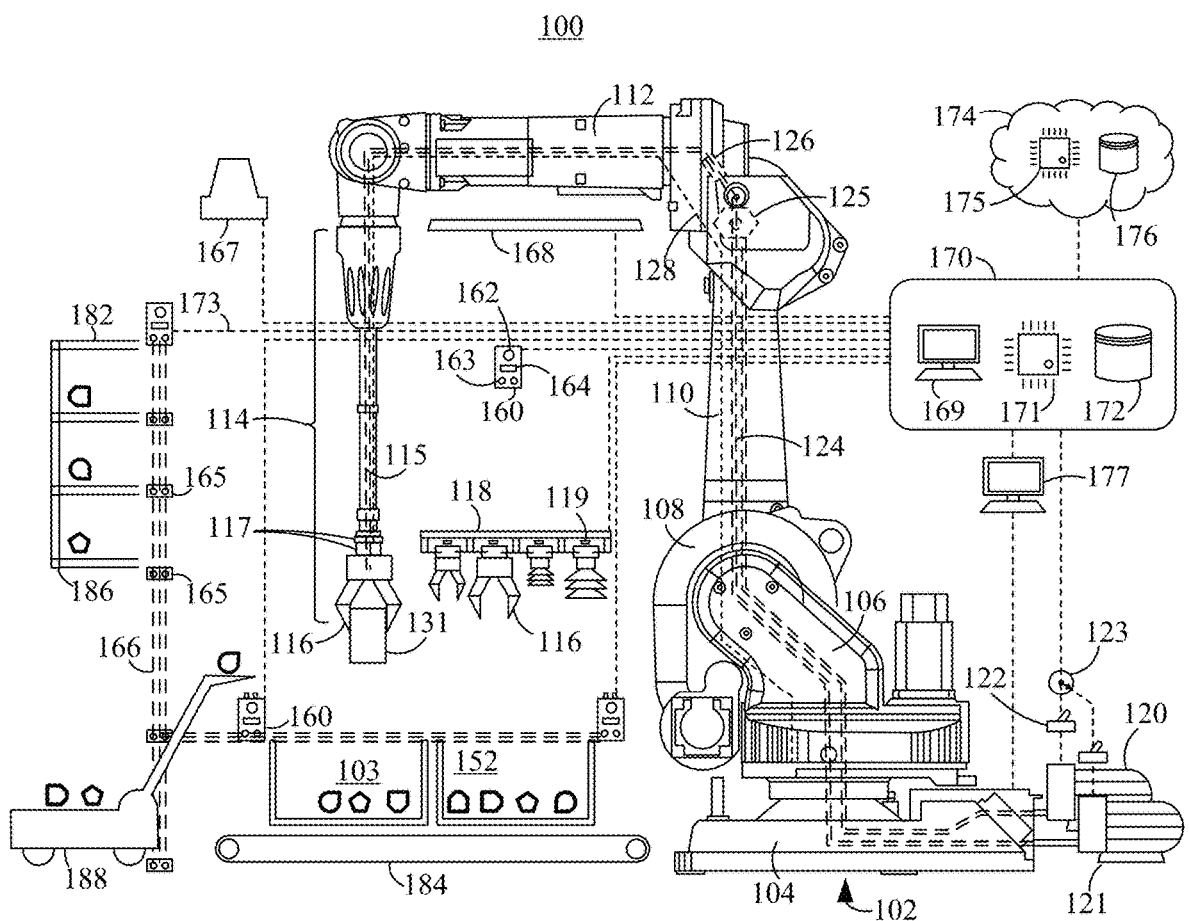
Figure 1C:
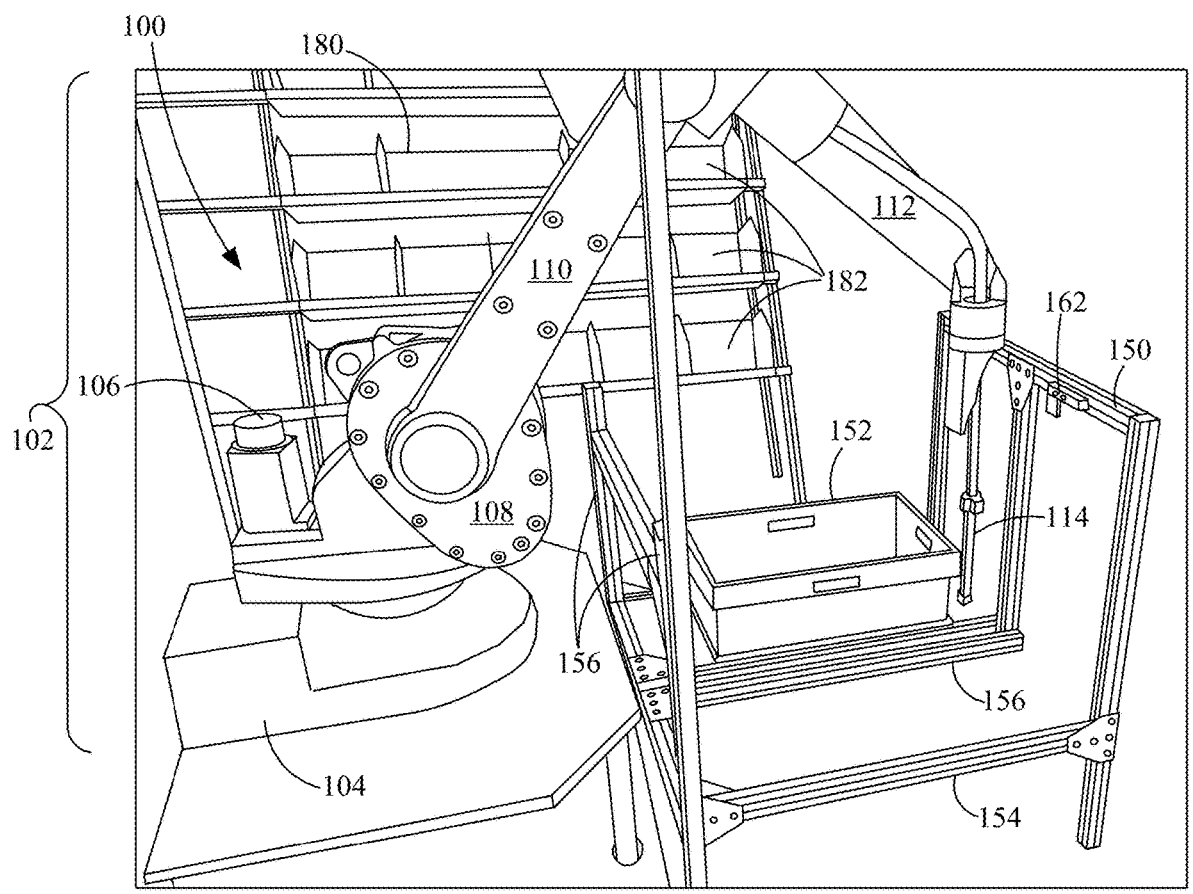

FIGS. 1A, 1B, and 1C show an exemplary robotic system 100 according to some embodiments of the present technology. The robotic system 100 is configured to manipulate a wide variety of objects 103 including novel objects that the system has not previously picked, placed, or even identified. In some embodiments, the robotic system is a pick, sort, and place robotic system.

In some embodiments, robotic system 100 includes an end effector, which further includes a tool that manipulates objects. In some embodiments, the end effector and the tool remain stationary relative to the robotic system while an object's position is controlled. For example, the robotic system may alter the slope or other characteristics of the surface on which the object is sitting to slide it into a stationary tool, such as a gripper or a suction.

In other embodiments, the end effector and the tool are attached to a motion device, such as a moveable robotic arm 102. The tool may include, for example, a knife that may slice or poke an object, a key that may open a lock, or a center punch that may mark a plate. In some embodiments, the tool is useful in a pick, sort, and place robotic system. Such tools may include grippers and suctions. Although the description below discloses tools and related systems for pick, sort, and place robotic systems, embodiments useful for other types of tools are readily apparent to those skilled in the art.

Pick, sort, and place robotic system 100 includes a robotic arm 102, various input and output components and structures such as a sorting stand 150 and a receptacle stand 180. An operator 101 may supervise or assist the robotic arm (see FIG. 1A). In some cases, the sorting stand 150 and/or receptacle stand 180 are replaced by or include a conveyor 184, a put wall 186, and/or an automated guided vehicle (AGV) 188, as shown in FIG. 1B. The robotic arm 102 identifies objects 103 from tote 152 in sorting stand 150, picks the objects, and places the gripped objects at locations in receptacle stand 180 (e.g., bins 182). As shown in FIG. 1C, sorting stand 150 may include support structure 154, which is a system of metal support members bolted together. The side of support structure 154 opposite to robotic arm 102 may include an opening allowing a tote (e.g., tote 152) or other receptacle to be inserted into sorting stand 150. Sorting stand 150 optionally includes base 156 for supporting receptacles.

Pick, sort, and place robotic system 100 also includes a control system 170 to monitor and manage robot motion. The control system provides instructions and/or command signals for moving (e.g., rotating, extending, retracting) the various components of robotic arm 102. The control system 170 includes a processor 171, memory 172 (e.g., a non-transitory computer-readable storage medium), data links 173, communications interfaces, and other components. The control system may also include an optional cloud component 174 with processors 175 and databases 176 accessible over a local or remote network (e.g., Internet).

Pick, sort, and place robotic system 100 also includes a vision system with a vision processor 169, sensor devices 160, and other components. Each sensor device 160 may have one or more cameras 162, a variety of sensors 163 (e.g., image, depth, visible light, and/or infrared sensors), barcode readers 164, or other components. In some cases, cameras 162 capture image data that includes visible light data (e.g., RGB data) and/or depth information (e.g., how far objects in the image are from the camera). The captured image data is sent to the control system for processing. The vision system can have any number of sensors and cameras. Its components can be supported by any robotic, input/output component or structure, and be located in other locations.

Pick, sort, and place robotic system 100 also includes a motion controller 177. The vision processor 169 and motion controller 177 may be external or located within the control system 170. FIGS. 1A and 1B, for example, show an external motion controller 177 and a vision processor 169 that is located within the control system.

Pick, sort, and place robotic system 100 may also include a light curtain system that includes multiple sensors 165 generating a light curtain 166. Pick, sort, and place robotic system 100 may also include a LIDAR 167. The light curtain system and the LIDAR may be used either for safety purposes (e.g., monitor human movement around the robotic system) or for operations (e.g., detect the movement of objects or system components). Pick, sort, and place robotic system 100 may also include lighting devices 168 that can be dimmed depending on tote color or other environmental and operational factors.

Robotic arm 102 includes base 104 for mounting to a support surface (e.g., the floor or some other support structure). Frame 106 is rotatably connected to base 104. Lower arm 108 is rotatably connected to frame 110. Upper arm 112 is rotatably connected to lower arm 108. End effector 114 is rotatably connected to upper arm 112. End effector 114 includes one or more tools 116 as well as a tube 115. The end effector 114 and each tool 116 have tool changer 117 parts allowing various tools to be compatible with the end effector 114. A tool rack 118 is used for storing and accessing the various tools. Each tool slot on the tool rack 118 has a tool sensor 119 to indicate the presence or absence of a tool. FIGS. 1A and 1B show multiple gripping and suction tools such as fingered grippers and suction tools of various sizes. In the case of FIG. 1, gripper 116 is a pneumatic gripper. Other grippers, such as gripping fingers or other types of suction grippers can also be used. In some cases, end effector 114 is compliant and/or multi-purpose.

Pick, sort, and place robotic system 100 may also include a vacuum source 120 (e.g., pump) or compressed air source 121 to provide the pressure necessary to use the tools, where vacuum denotes negative pressure and compressed air denotes positive pressure. Each source is controlled by a source switch 122 operable by the control system. A source selection switch 123 allows the control system to select the adequate source to operate the tool that is currently in use. A hose 124 runs through the robotic arm from the end effector to the source. A valve 125 allows the control system to select a pressure source, or to connect the hose to the atmosphere (i.e., no positive or negative pressure applied). A pressure sensor 126 allows the control system to monitor the pressure level within the hose. A component of a tool changer 127 permits efficient and reliable tool-changing. A weight sensor 131 located on the end effector allows the control system to monitor the weight of the tool and its load (see FIG. 1A). In some embodiments, a tool wire 128 running from the end effector to the base or to the frame of the robotic arm allows the control system to determine whether a tool is attached to the end effector.

All components of the control system 170 and vision system (e.g., cameras and sensors), are connected through data links 173. Furthermore, all components of the robotic system involved in motion or monitoring (e.g., motion controller 177, pump/selection switches 122/123, valve 125, pressure sensor 126, tool sensors 119, lighting devices 168) have data links 173 to the control system 170.

When the robotic system picks up a load using an end effector 114 attached with a load cell, the load cell detects the load's weight, by acting as a transducer that converts the gravitational force of the load, i.e., its weight, applied onto the load cell into an electrical output that the robotic system collects. However, most commercially available load cells are designed to handle and measure force in one dimension only. When the load cell is subjected to forces in other directions, the resulting torsion or bending may damage the load cell and distort the weight measurement.

A pick, sort, and place robotic system such as 100 necessitates high levels of robustness and dexterity, particularly in applications where speed is a requirement and objects vary in their shapes, dimensions, weights, materials, and levels of fragility. In such applications, picking tools with low footprints and having the least number of component parts are desirable. In particular, a low footprint would enable the picking tool to remain narrow, thus achieving a device that is physically compact while providing a large force to the fingers.

An embodiment of the present invention is a soft picking tool for a pick, sort, and place robotic system where the cavity and the fingers are integrated, exhibiting increased robustness and a reduced footprint. In addition, fingertips are embedded at the distal end of one or more fingers to enable a stronger and more accurate grip, an important feature to grasp in clutter.

The soft picking tool described in this disclosure includes a system designed for such a purpose.

Interaction Between System Components

In some embodiments, the pick and place robotic system includes a robotic arm with an end effector configured to have an attached tool at its distal end; a tool changing device; a tool rack; a vision system; and a control system. The tool changing device further includes a robotic arm attachment portion and a tool attachment portion. The tool rack includes one or more tool plates and a plurality of tools. The control system includes a processor, a non-transitory computer-readable storage medium, and a plurality of communication interfaces.

In some embodiments, at least one tool includes a tool attachment portion of the tool changing device at its proximal end. The robotic arm attachment portion is configured to attach to the tool attachment portion, and at least one tool plate of the one or more tool plates includes a tool slot.

In some embodiments, each tool plate has exactly one tool slot. In other embodiments, a tool plate may have more than one tool slot. In one embodiment, the tool rack further includes one or more sensors associated with a tool slot, where the one or more sensors are configured to indicate the presence of a tool in the tool slot.

In one embodiment, the control system receives data from each of the sensors on the tool rack and can determine, at any time, whether a given tool is located at its slot in the tool rack.

In yet another embodiment, the tool attachment portion further includes a plurality of grooves, and the plurality of grooves spatially corresponds to a tool slot on a tool plate.

The grooves enable tools to slide into the tool rack and to be retrieved from the tool rack in a robust and timely manner.

In one embodiment, the pick and place robotic system further includes a weight sensor at the distal end of the end effector, where the weight sensor is configured to measure the weight of an attached tool and its load (e.g., one or more objects).

A weight sensor may allow the control system to detect the presence or absence of a tool, the number of objects carried by it.

In one embodiment, the pick and place robotic system further includes an electric circuit, where the electric circuit is configured to indicate the presence of a tool attached to the end effector. In one embodiment, the electric circuit is a tool wire.

A tool wire may be configured to be in contact with a tool when a tool is attached to the end effector so as to convey to the control system whether a tool is attached. In one embodiment, the presence of a tool is determined electrically (e.g., through detecting a change in wire impedance, current intensity, voltage, etc.).

In one embodiment, the tool wire is run from the tool, through the pass-through end effector tube, to a proximal part of the robotic arm such as its base or its frame, where the information is conveyed to the control system through a data link.

In some embodiments, the pick and place robotic system further includes a plurality of input and output components, where at least one output component corresponds to an object type, and where the plurality of input and output components are selected from the group consisting of a sorting stand, a tote, a receptacle stand, a bin, a tote conveyor, an object conveyor, a put wall, an automated guided vehicle (AGV), and a shelf.

Objects may be classified by type. Object types may involve their shape (e.g., round vs. elongated objects), the material they are made of (e.g., plastic vs. metal objects), their color, or their nature (e.g., fruits vs. vegetables, apples vs. oranges). In one embodiment, objects having the same barcode or the same destination (e.g., shipping address, destination department in an office or plant, etc.) belong to the same object type. In one embodiment, objects belonging to the same order (e.g., they have the same order number) belong to the same object type. In one embodiment, each of the various output components (e.g., the bins in a sorting stand) are associated with distinct object types.

In some embodiments, the robotic arm and tool attachment portions further include a through-hole. In some embodiments, the through-hole transmits vacuum or compressed air between an attached tool and its corresponding source pump. In some embodiments, the through-hole includes a mechanical pass-through. In some embodiments, the through-hole includes an electrical pass-through. In further embodiments, the robotic arm and tool attachment portions include a plurality of through-holes, each of which may be any of the aforementioned types.

In one embodiment, the pick and place robotic system further includes a first hose, where the through-hole of the robotic arm attachment portion is connected to a distal end of the first hose.

In one embodiment, the pick and place robotic system further includes a pressure sensor, where the pressure sensor is located on the first hose. Data from the pressure sensor (e.g., a pressure reading) may indicate the presence or absence of an attached tool or a picked object.

In one embodiment, the pick and place robotic system further includes a source pump, where the source pump is connected to the proximal end of the first hose, and the source pump is selected from the group consisting of a vacuum pump and a compressed air pump.

In systems operating using a single source pump, the first hose is the hose 124, represented in FIGS. 1A and 1B, connecting the tool directly to the source pump, where the term "connect" denotes the enabled flow of air, vacuum, or pressure.

In another embodiment, the pick and place robotic system further includes a valve and one or more second hoses, where the valve connects the proximal end of the first hose to one valve output selected from the group consisting of the atmosphere and the one or more second hoses.

In one embodiment, the pick and place robotic system further includes one or more source pumps, where at least one of the one or more second hoses connects a valve output to one of the one or more source pumps, at least one tool of the plurality of tools corresponds to one of the one or more source pumps, and a source pump of the one or more source pumps is selected from the group consisting of a vacuum pump and a compressed air pump.

In systems operating using more than one source pump (e.g., one vacuum pump and one compressed air pump), a valve is required to switch between pumps or to connect the tool to the atmosphere (i.e., disconnect from all pumps). In this case, the first hose is the distal segment of the hose 124 shown in FIGS. 1A and 1B. Furthermore, a second hose is required to connect the valve to each of the source pumps. The second hoses represent the proximal segments of the hose 124 shown in FIGS. 1A and 1B, connecting the valve to each of the source pumps.

In one embodiment, each source pump has a pump switch to activate it, and a pump selection switch is used by the control system to activate the required pump switch through data links or any other form of control signaling (e.g., an electrical ON/OFF signal).

In other embodiments, a fluid pump is used to control a tool. In this case, the through-hole, hoses, pressure sensors, and valve, are configured to operate with a fluid.

In one embodiment, the vision system includes a vision processor, a plurality of vision communication interfaces, and one or more vision components selected from the group consisting of a camera, a barcode reader, a depth sensor, an infrared sensor, a light curtain system, and a LIDAR; and where at least one component of the vision system is connected to the vision processor through a data link, and the vision processor is connected to the control system through a data link In one embodiment, the pick and place robotic system further includes a lighting source, where the lighting source is configured to emit multiple light intensities.

In one embodiment, the control system controls robotic arm movements through a motion controller. In one embodiment, the motion controller also controls the valve.

In one embodiment, data from the pressure sensor, the weight sensor, the tool wire, the vision system sensors, the tool sensors, or any other component with a communication interface, is transmitted at regular time intervals to the control system (i.e., a data push). In another embodiment, such data is transmitted only upon request from the control system (i.e., a data pull).

In one embodiment, the tool wire is configured to provide the control system with information on the presence of an attached tool at the end effector continuously and instantaneously, through an electrical signal.

Construction and Components of the Soft Picking Tool

Figure 2A:
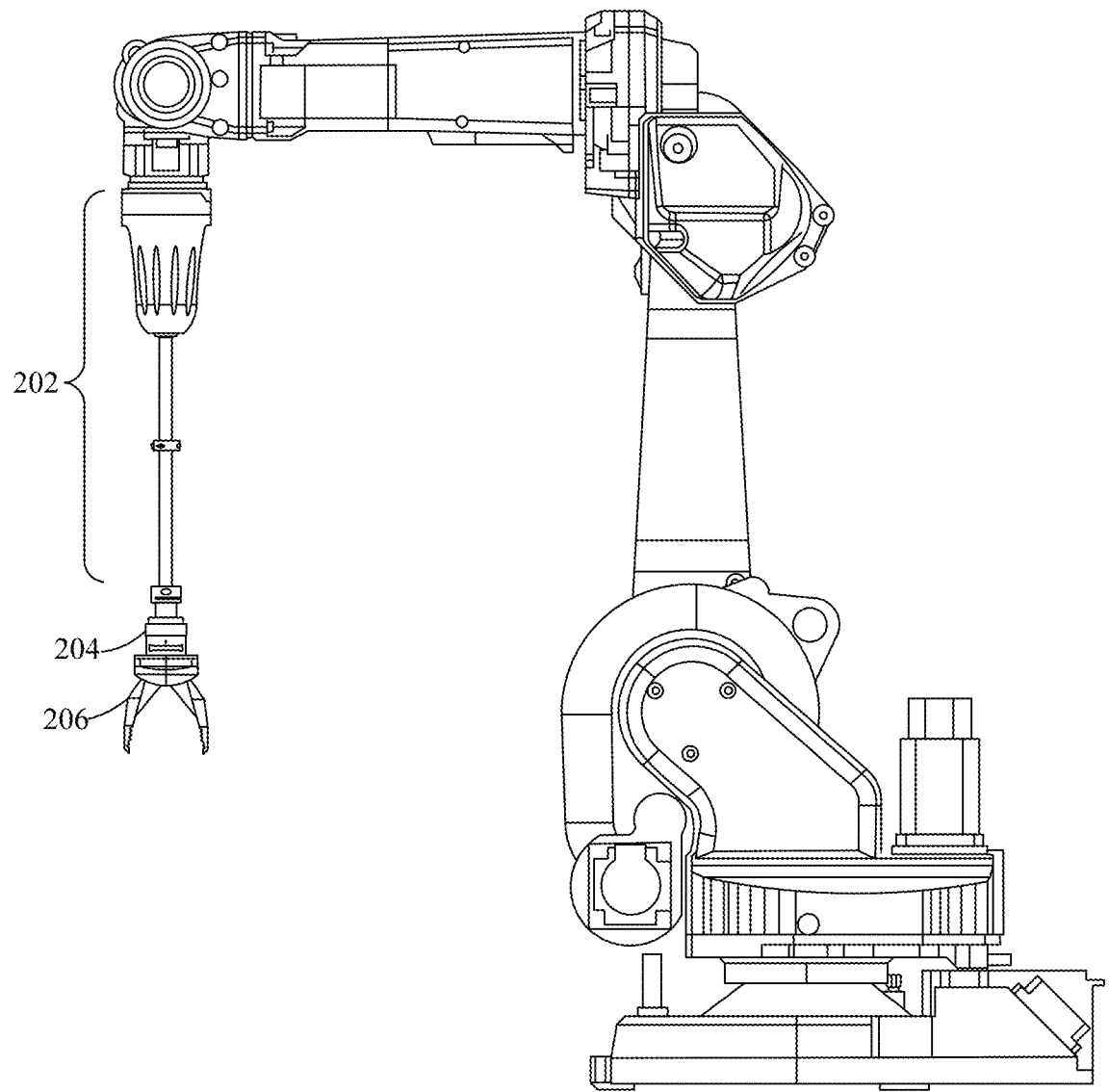
FIG. 2A shows an exemplary soft picking tool in the context of a pick, sort, and place robotic system, in accordance with one embodiment of the invention.

FIG. 2A shows an exemplary soft picking tool 206 in the context of a pick, sort, and place robotic system, in accordance with one embodiment of the invention. In a robotic system such as 100, a soft picking tool 206 is selected and attached to an end effector 202. In some embodiments, the attachment is at a distal end of the end effector 202. In some embodiments, the soft picking tool 206 is modular relative to the end effector 202 in that it may be swapped in and out with ease, using, for example, a tool change mechanism, either automatic or manual, i.e., the attachment is through a tool changer 204. In some embodiments, the soft picking tool 206 is directly attached to the end effector 202. In some embodiments, several different tools are integrated into one hand.

Figure 2B:
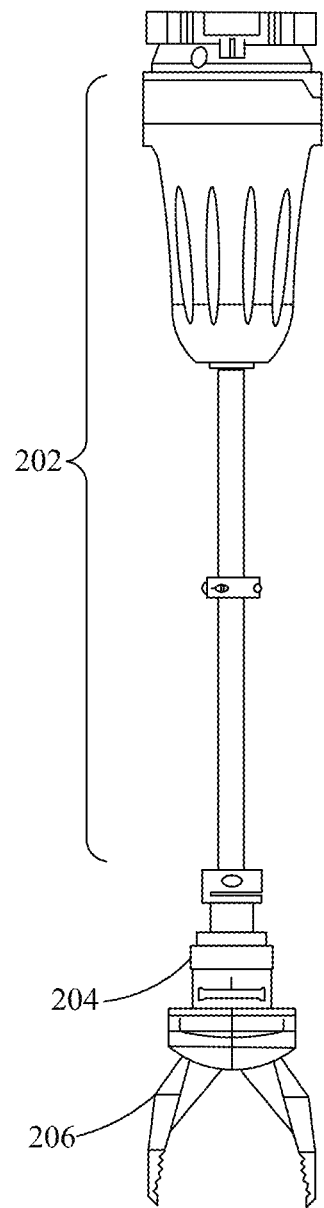
FIG. 2B shows an exemplary soft picking tool attached to an exemplary end effector of a pick, sort, and place robotic system, showing various components, in accordance with one embodiment of the invention.

FIG. 2B shows an exemplary soft picking tool 206 attached to an exemplary end effector 202 of a pick, sort, and place robotic system 100, showing the end effector's 202 vertical compliance system, the tool changer 204, and the soft picking tool 206, in accordance with one embodiment of the invention. When the robotic system 100 picks up a load using the soft picking tool 206, a positive pressure or a negative pressure is applied to the soft picking tool 206 via a vacuum or fluid channel traversing the vertical compliance system 202 and the tool changer 204. The applied pressure deforms a cavity holding a fluid (e.g., air) located within a body of the soft picking tool 206, causing the application of a force to a plurality of stiff fingers located at the distal end of the body. The subsequent movement of the plurality of stiff fingers leads to the opening or closing of the soft picking tool 206.

In some embodiments, the cavity is formed by one or more walls. In some embodiments, at least some of the walls are soft, i.e., those walls deform in response to pressure in the cavity, in which case the cavity is a soft-walled cavity. In some such soft-walled cavities, one or more walls may be stiff, i.e., those walls experience no or very little deformation in response to pressure in the cavity. In some embodiments, the integration between the cavity and the stiff fingers is achieved by molding the body as a single piece that includes at least a portion of the cavity and the stiff fingers. In some such embodiments, the portion of the cavity included in the body includes soft walls adjacent to the stiff fingers. In other embodiments, the integration is achieved by 3D-printing the components together as a single piece. In other embodiments, the integration is achieved by mechanically attaching the components via standard means, such as latches, screws, clips, and holes. Integrating at least a portion of the soft-walled cavity and stiff fingers together within a single-piece body presents several advantages. First, this enables a reduced footprint compared to picking tools that are based on separate affixed fingers. Second, this enables the picking tool to remain narrow, thus achieving a device that is physically compact while providing a large gripping or spreading force. Third, the body exhibits increased robustness in dynamic applications requiring speedy and repetitive operation of the robotic system 100. The single piece design removes the need for linkages, moving pneumatic seals (as found in a typical pneumatic cylinder), and other moving parts. This eliminates maintenance requirements and reduces the likelihood of component failure. The low part count and simple construction reduces production and assembly costs.

Figure 3A:
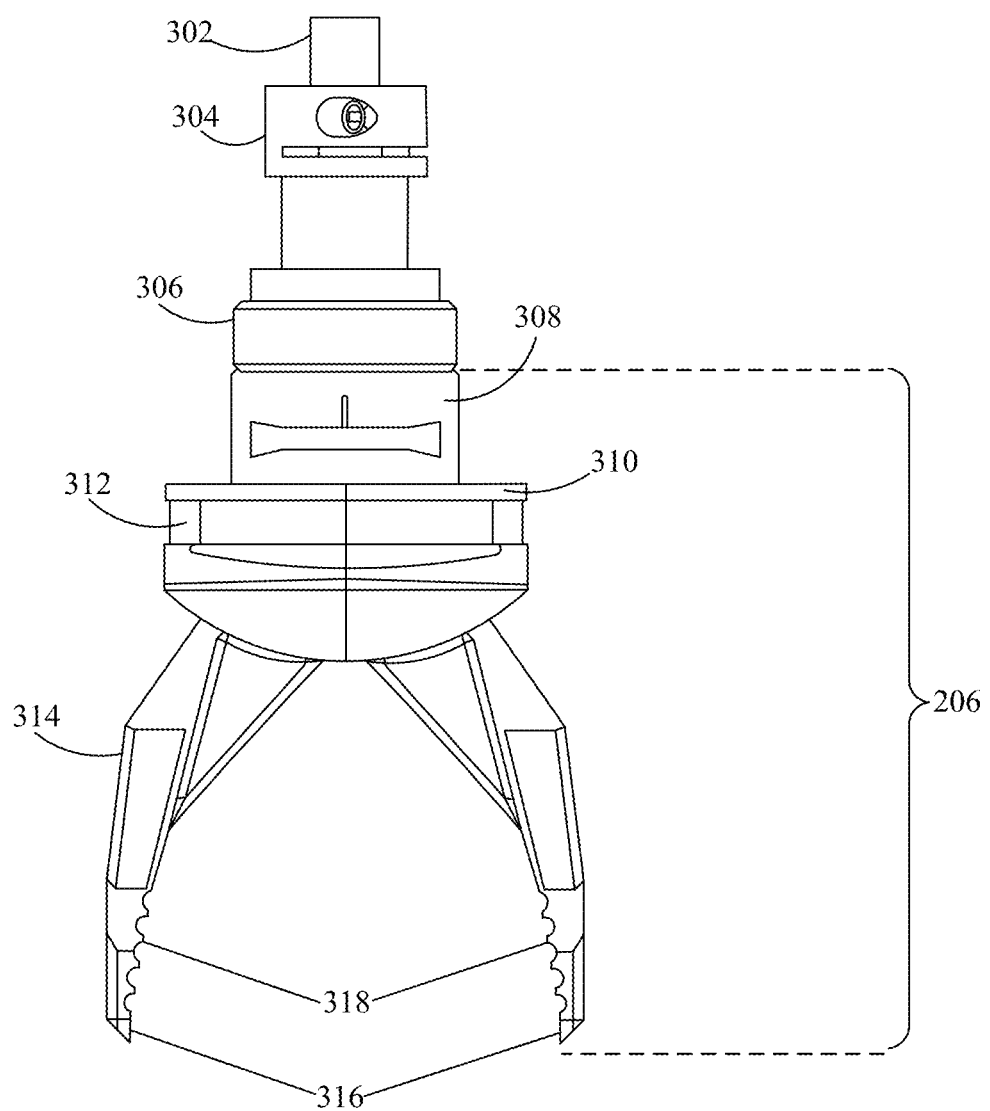
FIG. 3A shows a side view of an exemplary soft picking tool attached to an exemplary end effector of a pick, sort, and place robotic system, showing various components, in accordance with one embodiment of the invention.
Figure 6:
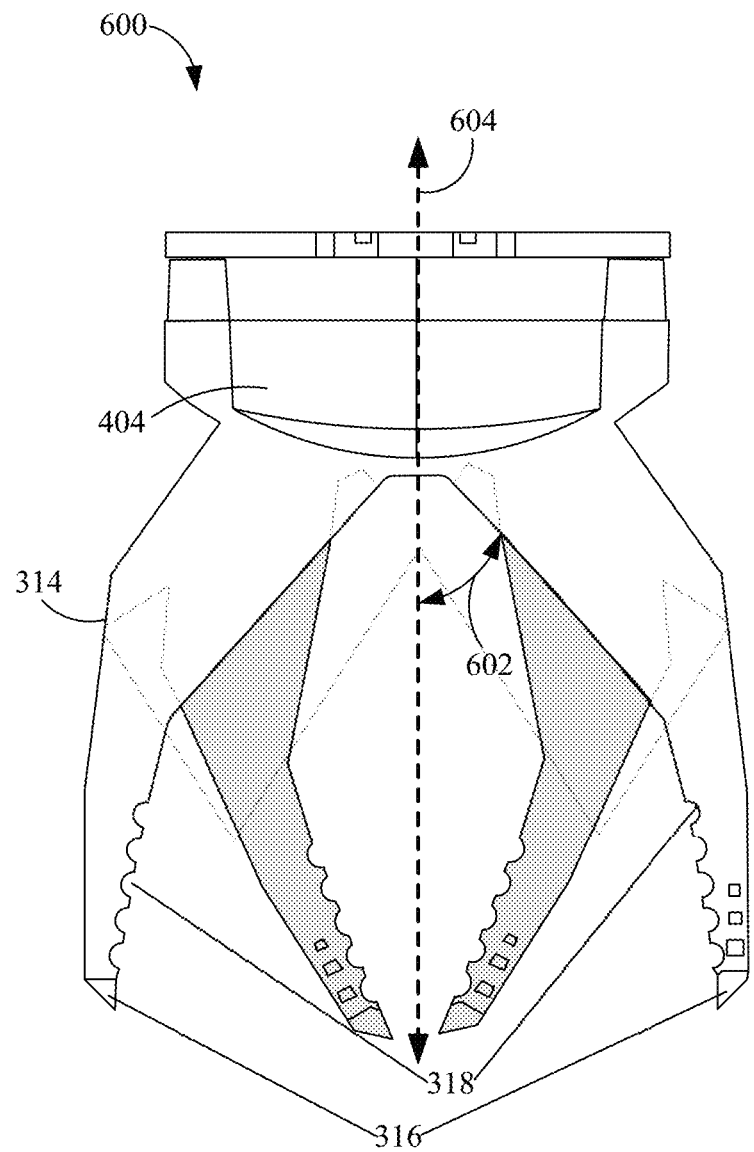
FIG. 6 shows a cross-sectional side view of various components of an example soft picking tool for a pick, sort, and place robotic system, including illustrative open and closed finger positions, in accordance with one embodiment of the invention.

FIG. 3A shows a side view of an exemplary soft picking tool 206 attached to an exemplary end effector of a pick, sort, and place robotic system 100, showing various components, in accordance with one embodiment of the invention. The soft picking tool 206 is based on a body 314 made of an integrated piece, including at least a portion of a soft-walled cavity and a plurality of stiff fingers 318 that are located on a distal end of the body 314. The stiffness of the fingers 318 relative to the cavity wall allows the soft picking tool 206 to exert sufficient force on the load (e.g., an object). The soft-walled cavity within the body 314 of the soft picking tool 206 is configured to be deformed by a modification of pressure inside the cavity through pumping vacuum or fluid (e.g., air). In some embodiments, the deformation of the cavity leads to a motion of the stiff fingers 318, from a rest position, towards a medial axis of the soft picking tool 206, causing a gripping motion of the picking tool 206, as shown in FIG. 6. In some embodiments, the deformation of the soft-walled cavity leads to a motion of the fingers 318, from a rest position, away from the medial axis of the soft picking tool 206, causing a spreading motion of the picking tool 206. In some embodiments, the same soft picking tool 206 may exhibit spreading or gripping motions or positions in response to distinct pressure levels applied to the cavity.

In some embodiments, the body 314 of the picking tool 206 is molded using rubber. In other embodiments, other soft materials may be used. In some embodiments, the body 314 is made from a flexible polyurethane rubber. In some embodiments, the body 314 is made from flexible silicone rubber. In some embodiments, a portion of the soft-walled cavity and the stiff fingers 318 are molded into one piece that is made from the same material. In other embodiments, the portion of the soft-walled cavity is molded using rubber but the stiff fingers 318 are not. Unlike the cavity walls, the fingers 318 are stiff, as they are not deformed when pressure is applied to the soft picking tool 206. This is related to the design of the body 314 and the extent of the soft-walled cavity, as is described below in the context of FIGS. 5A and 5B. In particular, in some embodiments, the soft-walled cavity does not extend into the fingers 318.

Figure 3B:
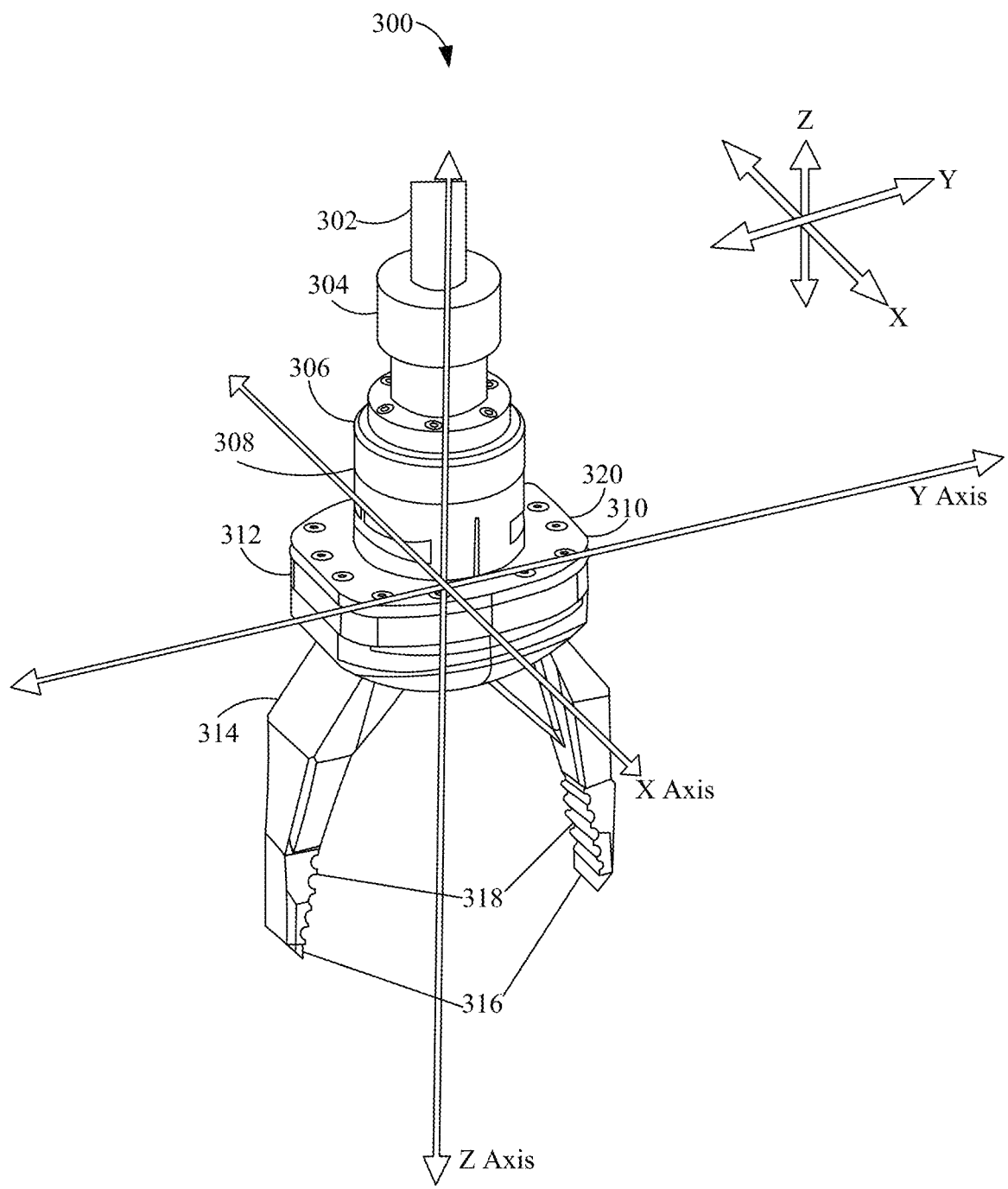
FIG. 3B shows an isometric view of an exemplary soft picking tool in the context of the end effector of a pick, sort, and place robotic system, showing various components, in accordance with one embodiment of the invention.

In some embodiments, the fingers 318 are designed with additional features to increase traction on gripped objects. For example, the surfaces of the fingers 318 may be serrated. In some embodiments, the soft picking tool 206 further includes one or more fingertips 316 that are embedded on the distal end of one or more of the stiff fingers 318. In some embodiments, the fingertips 316 are harder than the finger 318. In some embodiments, the fingertips 316 are softer than the finger 318. In some embodiments, the fingertips 316 are made of a plastic or a metal. In some embodiments, the fingertips 316 are cast in place. In other embodiments, the fingertips 316 are detachable from their corresponding finger. In some embodiments, the fingertips 316 are swappable with other fingertips 316. In other embodiments, they are attached to the fingers 318 via screws. In some embodiments, the fingertips 316 are made of an isotropic polymer. In some embodiments, the fingertips 316 are made of acrylonitrile butadiene styrene (ABS) or nylon. In some embodiments, the fingertips 316 are made of aluminum, POM plastic, or stainless steel. Any material that undergoes little or no deformation throughout picking operations may be used. The fingertips 316 may be serrated to improve their grip. The serrations may be oriented towards the medial axis for gripping, away from the medial axis for spreading, or both. (FIG. 3B shows the various axes of operation.)

The fingertips 316 extend the picking and manipulation capabilities of the soft picking tool 206. For example, the fingertips 316 allow the fingers 318 to penetrate narrow spaces between objects or adjacent to walls. They also allow fingers 318 to grasp fragile objects (e.g., fruit) using less force than would otherwise be needed. This feature enables more accurate and agile picking to grasp in cluttered environments, particularly when the target objects cannot be picked up by suction-based approaches.

The soft walls of the body 314 of the soft picking tool 206 allow the soft picking tool 206 to withstand high pressures applied to its fingers 318 without sustaining damage. In addition, it avoids the slipping or crushing of picked objects. Overall, the combination of soft body 314 and fingertips 316 expands the range of objects the soft picking tool 206 can handle.

In some embodiments, the soft picking tool 206 further includes an embedded mounting ring 312 and an adapter plate 310, where the embedded mounting ring 312 is attached to both the body 314 and to the adapter plate 310, as shown in FIG. 3A. In some embodiments, the embedded mounting ring 312 and the adapter plate 310 are a single component. The adapter plate 310 seals the proximal end of the soft-walled cavity so that the walls of the soft-walled cavity include the mounting ring 312 and the adapter plate 310. In some embodiments, the mounting ring 312 and the adapter plate 310 are stiffer than the walls of the soft-walled cavity contributed by the body 314. In some embodiments, the adapter plate 310 includes an adapter plate medial channel that allows the pumping of vacuum or fluid to and from the cavity.

In some embodiments, the soft picking tool 206 further includes a lower part 308 of a tool changer 204 that is attached to the adapter plate 310 and connects to the robotic system 100 through an upper part 306 of the tool changer 204. The tool changer's upper 306 and lower parts 308 allow the robotic system to switch from one tool easily and quickly to another. In some embodiments, one or both parts 306, 308 of the tool changer 204 includes a tool changer medial channel that allow the pumping of vacuum or fluid to and from the cavity. The tool changer medial channel is aligned with the adapter plate medial channel. In some embodiments, the tool changer's upper 306 is further connected to a vacuum tube 302 via a tube clamp 304.

In some embodiments, the embedded mounting ring 312 is the attachment component between the body 314 and the rigid components of the soft picking tool 206. In some embodiments, it espouses the shape of the soft-walled cavity in the resting position, when no pressure is applied to the picking tool 206, as shown in FIG. 3A. In some embodiments, the embedded mounting ring 312 is made of a plastic or a metal. In some embodiments, the embedded mounting ring 312 is made of an isotropic polymer. In some embodiments, the embedded mounting ring 312 is made of acrylonitrile butadiene styrene (ABS) or nylon. In some embodiments, the embedded mounting ring 312 is made of aluminum, POM plastic, or stainless steel. Plastic materials are lighter, and are typically easier to manufacture in mass quantities (via injection molding, 3D printing, etc.).

In some embodiments, the adapter plate 310 is harder than the embedded mounting ring 312, and is able to universally connect wide ranges of bodies 314 or embedded mounting ring shapes 312 with the standard shaft components located at the proximal end of the end effector 202. In some embodiments, the adapter plate 310 is made of nylon. In other embodiments, other hard materials may be used for the adapter plate 310.

In some embodiments, the body 314 is made of flexible polyurethane rubber or silicone rubber, which offer durability, flexibility, and the ability to be molded. In some embodiments, the tool changer 204 (lower half 308) is made of ABS, POM, or nylon. In some embodiments, the embedded ring 312, the fingertips 316, the adapter plate 310, and the tool changer 204 (upper half 306) is made of aluminum, stainless steel, ABS, POM, or nylon. Aluminum and stainless steel are corrosion-resistant. The listed materials have high durability, impact strength, and abrasion resistance (particularly helpful for fingertips). Furthermore, the materials are low weight, with plastics being the lightest, and aluminum being lighter than stainless steel.

FIG. 3B shows an isometric view 300 of an exemplary soft picking tool 206 attached to an exemplary end effector 202 of a pick, sort, and place robotic system 100, showing various components, in accordance with one embodiment of the invention. In particular, FIG. 3B illustrates the relative position of the various components according to one embodiment of the present invention, from the proximal end to the distal end of the tool effector. At the proximal end of the tool effector (top of FIG. 3B), FIG. 3B shows a vacuum tube 302, a tube clamp 304, and an upper half 306 of a tool changer 204. The upper half 306 of the tool changer 204 connects to the soft picking tool 206 through a lower half 308 of the tool changer. FIG. 3B shows the remaining parts of the tool changer 204 according to an embodiment of the present invention. These include, from the proximal end to the distal end of the tool effector, the lower half 308 of the tool changer 204, an adapter plate 310 affixed to an embedded mounting ring 312 using mounting screws 320, a rubber picking tool body 314, and embedded fingertips 316.

In addition, FIG. 3B illustrates a positioning of the soft picking tool 206 with respect to the frontal (or rotational) axis, labeled X; the lateral axis, labeled Y; and the medial axis (the axis of the vacuum/fluid tube), labeled Z; according to an embodiment of the present invention. In FIG. 3B, the two stiff fingers 318 are molded along the lateral axis, which is perpendicular to the medial axis of the soft picking tool, where the motion of the two stiff fingers 318 is a rotation around a frontal axis (or rotational axis) perpendicular to both the lateral axis and the medial axis of the soft picking tool.

Although the soft picking tool 206 may include more than two fingers, a two-finger design enables the picking tool to maintain a small footprint while allowing a wide range of force to be exerted by each finger. Large-footprint grippers risk deforming or damaging the objects around the target object. In contrast, the small footprint allows the soft picking tool 206 to remain narrow, thus achieving a device that is physically compact while providing a potentially large gripping force. Overall, the single-piece two-finger design enables the application of a wider range of force through a smaller number of fingers compared to other designs. In addition, when coupled with fingertips, the overall design allows better grips and improved access to narrower spaces. These factors facilitate the picking of objects of irregular shapes and sizes, as well as objects that involve loose packaging (e.g., non-boxed objects).

In some embodiments, the soft picking tool 206 includes a single finger. Such a tool may be used, for instance, to push or press objects for general object manipulation or to conform to irregularly shaped objects.

In some embodiments, the number of and the spatial arrangement of fingers in the soft picking tool 206 is configured to grip a specifically shaped object. Varying the number of and the spatial arrangement of fingers to achieve a specific result would be apparent to those skilled in the art.

Figure 4A:
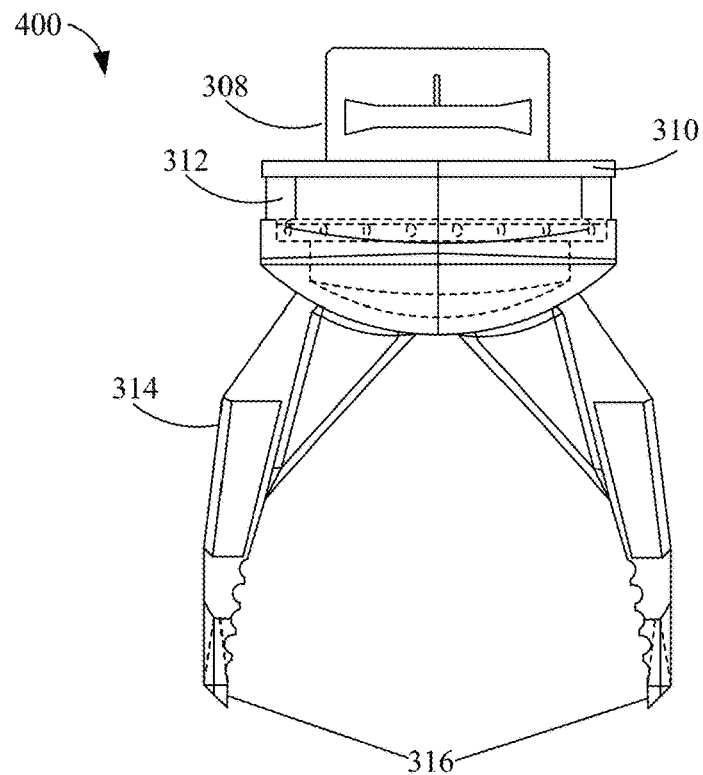
FIG. 4A shows a side view of various components of an example soft picking tool for a pick, sort, and place robotic system, where the body of the soft picking tool is shown to be transparent, in accordance with one embodiment of the invention.

FIG. 4A shows a side view 400 of various components of an example soft picking tool 206 for a pick, sort, and place robotic system 100, where the body 314 of the soft picking tool is shown to be transparent, in accordance with one embodiment of the invention. FIG. 4A shows a lower half 308 of a tool changer 204, an adapter plate 310, an embedded mounting ring 312, a rubber picking tool body 314, and embedded fingertips 316.

Figure 4B:
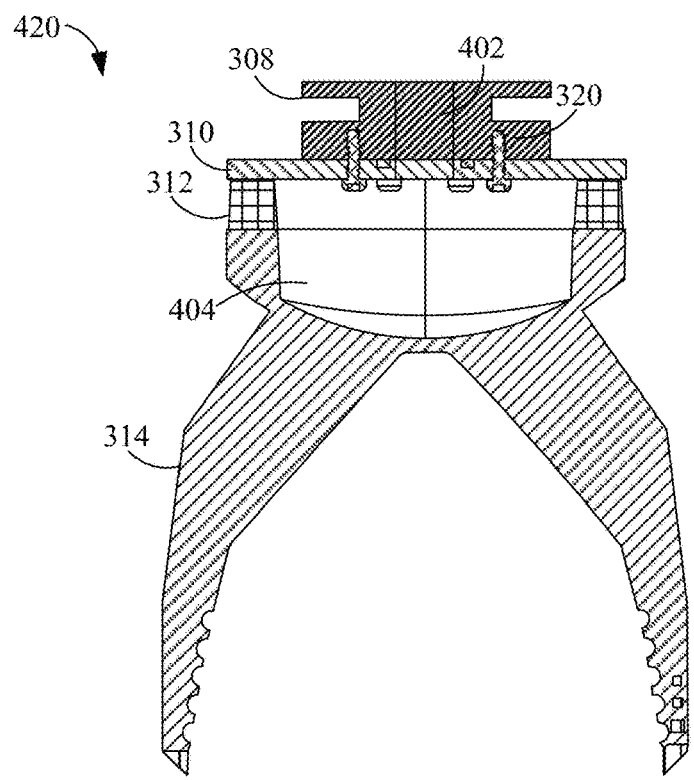
FIG. 4B shows a cross-sectional side view of various components of an example soft picking tool for a pick, sort, and place robotic system, in accordance with one embodiment of the invention.

FIG. 4B shows a cross-sectional side view 420 of various components of an example soft picking tool 206 for a pick, sort, and place robotic system 100, in accordance with one embodiment of the invention. In particular, FIG. 4B depicts a cross section 420 of a vacuum channel 402 traversing the lower half 308 of the tool changer 204 and the adapter plate 310, a cross-section of a vacuum cavity 404 within the body 314 of the soft picking tool 206, as well as mounting screws 320 used to attach the adapter plate 310 to the lower half 308 of the tool changer 204.

Figure 5A:
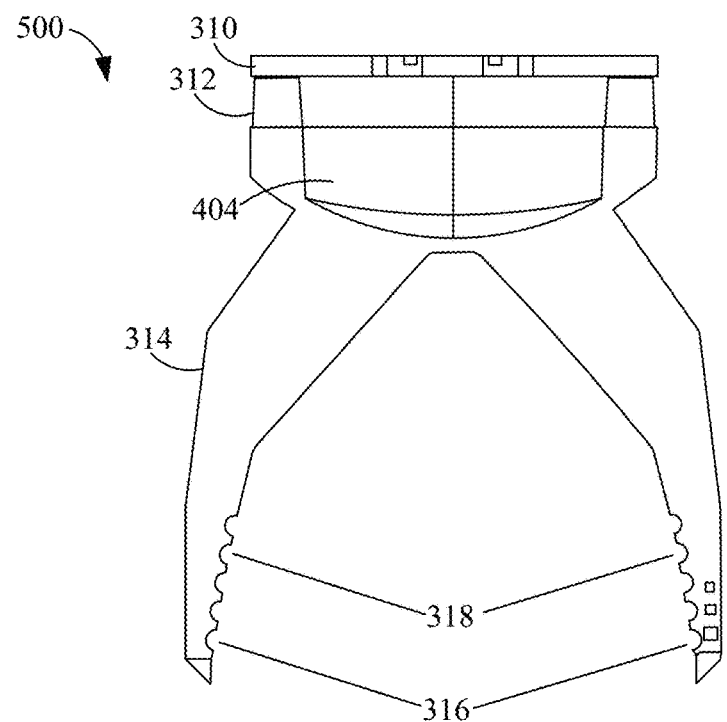
FIG. 5A shows a cross-sectional side view of various components of an example soft picking tool for a pick, sort, and place robotic system, in accordance with one embodiment of the invention.

FIG. 5A shows a cross-sectional side view 500 of various components of an example soft picking tool 206 for a pick, sort, and place robotic system 100, in accordance with one embodiment of the invention. These various components include the adapter plate 310, the embedded mounting ring 312, the rubber picking tool body 314, and the embedded fingertips 316.

Figure 5B:
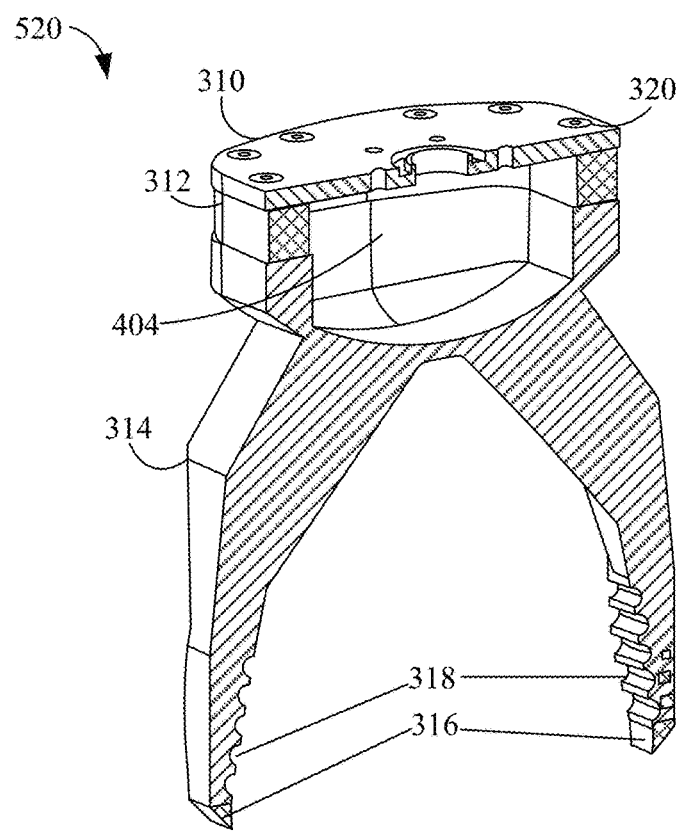
FIG. 5B shows a cross-sectional isometric view of various components of an example soft picking tool for a pick, sort, and place robotic system, in accordance with one embodiment of the invention.

FIG. 5B shows a cross-sectional isometric view 520 of various components of an example soft picking tool 206 for a pick, sort, and place robotic system 100, in accordance with one embodiment of the invention. These various components include the adapter plate 310, the embedded mounting ring 312, the rubber picking tool body 314, and the embedded fingertips 316.

FIGS. 5A and 5B illustrate the boundaries of the soft-walled vacuum cavity 404, according to one embodiment. The restriction of the vacuum cavity 404 to the upper part of the body, to the exclusion of the fingers 318, allows the fingers 318 to be thicker than the walls of the cavity 404, leading to their relative stiffness compared to the walls of the cavity 404.

FIGS. 4A, 4B, 5A, and 5B illustrate embodiments of the soft tool picking tool 206 that include two stiff fingers 318. In some embodiments, the body 314, the embedded mounting ring 312, and the adapter plate 310 of the soft picking tool are narrower along the frontal axis than along the lateral axis. This allows the shape of the soft-walled cavity 404 to be laterally elongated, as illustrated in FIGS. 4A, 4B, 5A, and 5B. In some embodiments, the soft-walled cavity 404 takes a spherical or hemispherical shape. In some embodiments, the soft-walled cavity 404 takes a non-spherical (e.g., paraboloidal, cylindrical, ovoid, ellipsoidal) shape. The soft-walled cavity 404 is shown in FIG. 5B to take a roughly cylindrical shape. In addition, the laterally elongated shape of the base of the soft picking tool (i.e., the proximal part of the body 314 housing the cavity 404, the embedded mounting ring 312, and the adapter plate 310) enable a shrinking of the base along the frontal axis, thus making the tool less cumbersome. For instance, this allows the tool to avoid hitting a container wall in flush grasping applications.

In some embodiments, the asymmetry in the shape of the body 314 between the frontal and lateral axes causes more deformation of the soft-walled cavity 404 in the direction of closure of the stiff fingers 318, when pressure is applied to the soft picking tool.

In some embodiments, when a negative pressure (vacuum) is applied to the body 314 via the vacuum tube 302, the soft-walled cavity 404 collapses inwards, leading to a force applied on the fingers 318 in the direction of closing the tool (i.e., towards the medial axis), which pulls the fingers 318 of the gripper together. When a positive pressure is applied to the tool body 314 via the vacuum tube, the soft-walled cavity 404 expands outwards, leading to a force applied on the fingers 318 in the direction of opening the tool (i.e., away from the medial axis), which pulls the fingers 318 of the gripper apart. In other embodiments, the effect of pressure is reversed: a positive pressure applied to the tool body 314 leads to the soft-walled cavity 404 collapsing inwards, leading to a force applied on the fingers 318 in the direction of closing the tool; and a negative pressure (vacuum) applied to the body 314 leads to the soft-walled cavity 404 expanding outwards, leading to a force applied on the fingers 318 in the direction of opening the tool.

In some embodiments, the collapse or expansion of the soft-walled cavity 404 is a roughly uniform motion around the surface of the soft walls. In other embodiments, the collapse or expansion of the soft-walled cavity 404 is a non-uniform motion around the surface of the soft walls, depending on the shape of the soft-walled cavity 404. In some embodiments, the soft-walled cavity 404 takes a spherical or hemispherical shape. In some embodiments, the soft-walled cavity 404 takes a non-spherical (e.g., paraboloidal, cylindrical, ovoid, ellipsoidal) shape, which helps to decrease the overall footprint of the soft picking tool for cluttered grasping applications. A design that is laterally elongated also benefits flush grasping, as mentioned above. In some embodiments, the soft-walled cavity 404 is asymmetrical. For example, the cavity 404 may have thicker walls along one of the two lateral directions, leading to an asymmetrical movement of the fingers 318, whereby different applied force levels or positions (e.g., aperture angles) are exhibited by the stiff fingers 318 in response to a given level of pressure applied to the soft picking tool 206.

In some embodiments, the body 314 is designed so that the stiff fingers 318 are not identical or respond non-identically to a given level of applied pressure. An asymmetry in the shape, size, or response to pressure (e.g., different aperture angle) may facilitate the picking of specifically shaped objects (e.g., books). Furthermore, in some embodiments, the fingertips 316 located at the distal end of one or more stiff fingers 318 may have distinct shapes or be made of distinct materials. For example, wide fingers or fingertips 316 may be more adequate for picking groups of small objects at the same time. For example, the use of one wider finger and/or fingertip 316 may facilitate lateral scooping and lifting as part of the picking action. It is clear to those skilled in the art that a wide range of specialized soft picking tools are possible through the design of various finger configurations and fingertip formats.

FIG. 6 shows a cross-sectional side view 600 of various components of an example soft picking tool 206 for a pick, sort, and place robotic system 100, including illustrative open and closed finger positions, in accordance with one embodiment of the invention. In this embodiment, pressure applied to the soft picking tool 206 causes a motion of the fingers 318 from their rest position towards the medial axis 604, leading to a gripping motion of the soft picking tool 206. In FIG. 6, a specific pressure level applied to the soft picking tool 206 causes one of the fingers 318 to reduce its aperture angle 602 to an angle ⊖, where the aperture angle 602 is the angle formed between the finger 318 and the medial axis 604 of the soft picking tool. In some embodiments, each finger 318 is sufficiently stiff so that each finger undergoes less deformation than the cavity 404 does as the aperture angle 602 changes. In some embodiments, each finger 318 is sufficiently stiff so that each finger does not undergo deformation as the aperture angle 602 changes. In some embodiments, the fingers 318 touch each other when the deformation in the cavity 404 is sufficiently high. This may occur at the fingertips 316 or elsewhere along the fingers 318. In other embodiments, the fingers 318 never touch each other no matter how deformed the cavity 404 is.

In some embodiments, the fingers 318 do not deform until at least after they come into physical contact with one another or with an object.

In some embodiments, the soft picking tool therefore reacts to various levels of applied pressure (e.g., different levels of pressure result in different levels of force). After calibration, a desired force for the soft picking tool 206 may be achieved by adjusting the applied pressure appropriately. Consequently, a plurality of levels of pressure, applied inside the soft-walled cavity 404, may lead to a plurality of corresponding levels of force applied by each of the plurality of stiff fingers 318 on an object, or to a plurality of corresponding positions of each of the plurality of stiff fingers 318, according to some embodiments of the present invention.

In some embodiments, the soft picking tool may include an external valve that may be opened or closed by a user or by an automatic system to maintain a particular pressure level inside the soft-walled cavity 404, thus avoiding the need to continue applying pressure to the soft picking tool 206 in order to maintain a specific finger position or force.

In some embodiments, the soft picking tool may include a proportional air valve enabling the application of specific levels of pressure to the soft picking tool 206, leading consistently to corresponding levels of force exerted by the stiff fingers 318, or leading to corresponding positions of the stiff fingers 318 (e.g., aperture angles). In some embodiments, a proportional air valve controls vacuum pressure. In these embodiments, the proportional air valve is controlled through an I/O controller with an analog voltage signal, and the pressure is monitored via the I/O controller and the analog pressure sensor.

In some embodiments, the motion of the plurality of stiff fingers 318 from the rest position may be a gripping motion that occurs only towards the medial axis 604 of the soft picking tool 206, as shown in FIG. 6, a spreading motion that occurs only away from the medial axis 604 (not shown in FIG. 6), or a combination of both gripping and spreading motions relative to the medial axis 604. Objects with open cavities (e.g., cups) or having concave structures or portions (e.g., rings, cones, hooks) may thus be picked or moved through the application of a spreading motion. In such embodiments, fingertips 316 may be included on the surface of the fingers 318 away from the medial axis 604. This may be instead of or in addition to fingertips 316 included on the surface of the fingers 318 towards the media axis 604. Picking or moving objects in such a manner would be advantageous when there is a need to occupy less space in a crowded environment, when the outside surface of an object is difficult to grip, and when the robotic arm is handing over an object to another robotic arm or use to grasp from the outside surface. Spreading may also be used by a robotic arm to separate objects from one another, away from walls, or away from other obstacles.

Figure 7A:
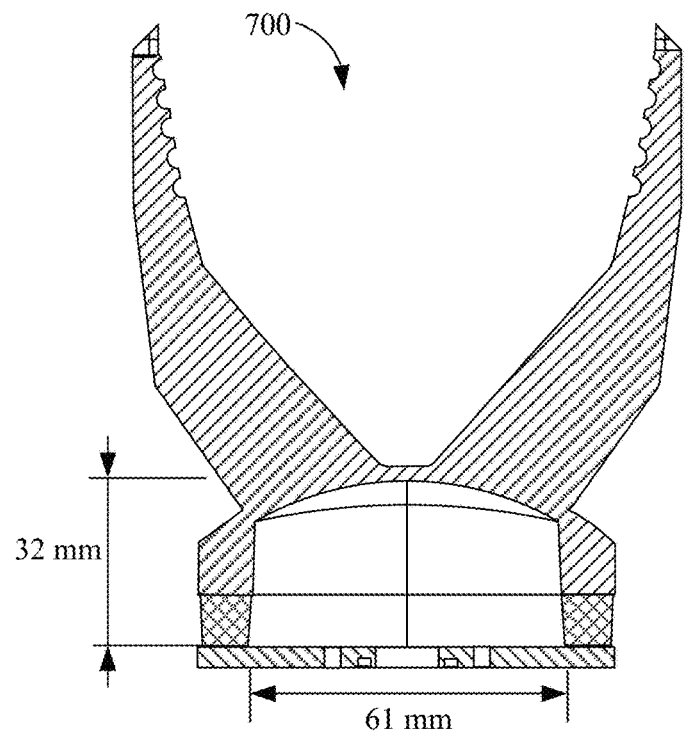
FIGS. 7A and 7B show front views and exemplary dimensions of an example soft picking tool for a pick, sort, and place robotic system, in accordance with one embodiment of the invention.
Figure 7B:
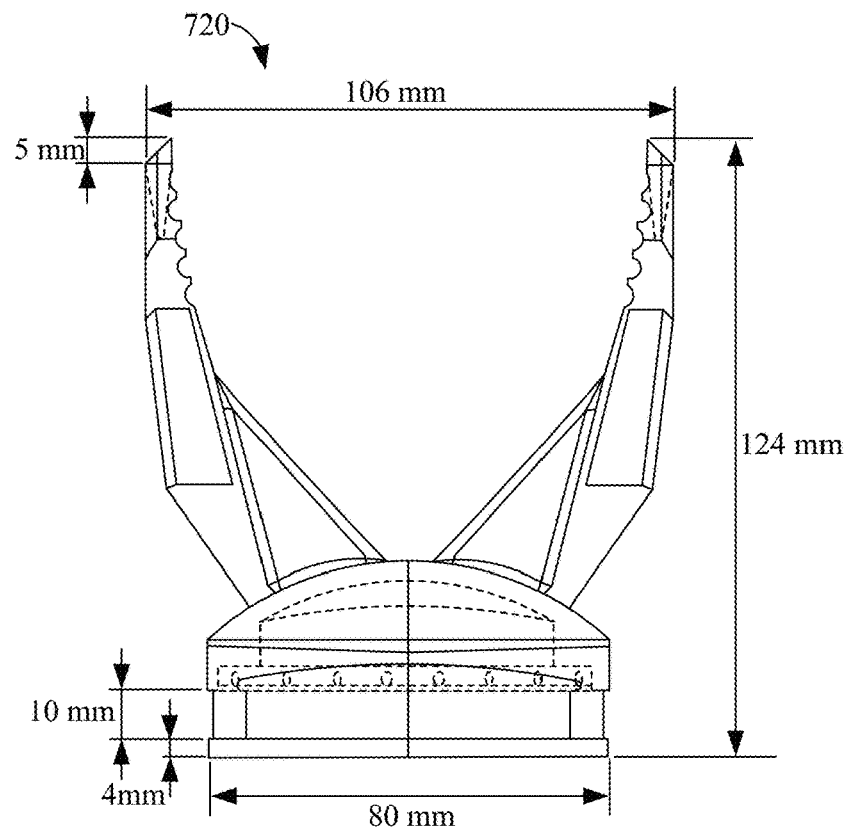
Figure 7C:
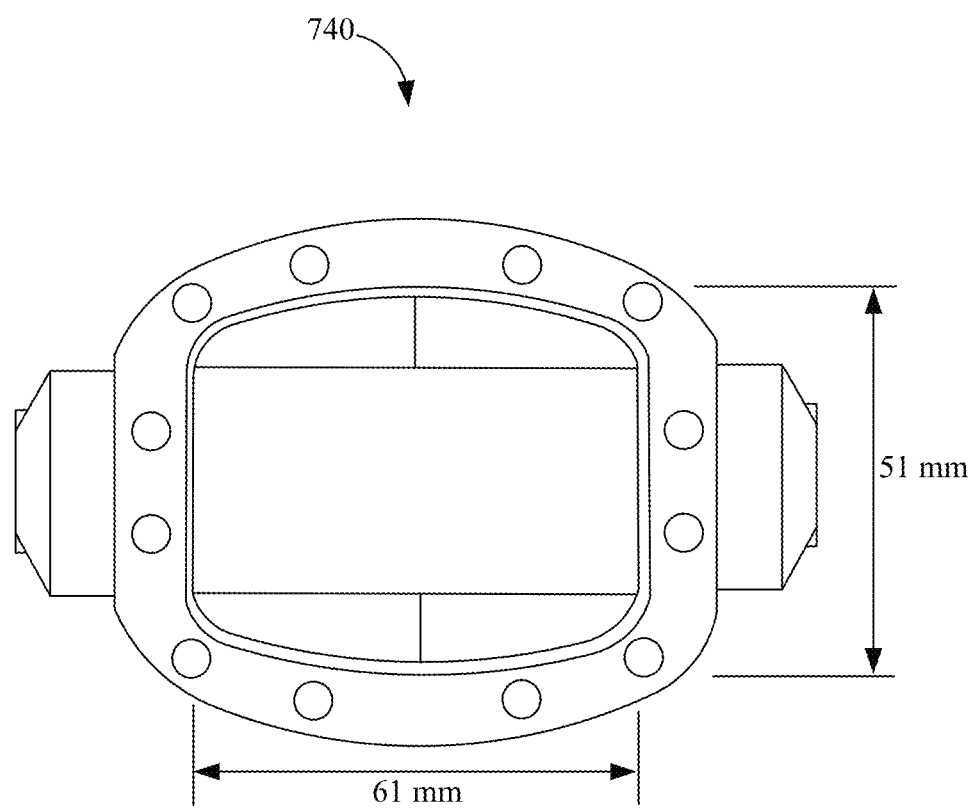
FIG. 7C shows a top view and exemplary dimensions of an example soft picking tool for a pick, sort, and place robotic system, in accordance with one embodiment of the invention.

FIGS. 7A and 7B show front views 700 and 720 and exemplary dimensions of an example soft picking tool for a pick, sort, and place robotic system, in accordance with one embodiment of the invention. FIG. 7C shows a top view 740 and exemplary dimensions of an example soft picking tool for a pick, sort, and place robotic system, in accordance with one embodiment of the invention. In particular, as shown in FIG. 7C, the size of the cavity along the frontal and lateral axes are not the same. This asymmetry in the causes more deformation of the soft-walled cavity 404 in the direction of closure of the stiff fingers 318, when pressure is applied to the soft picking tool. As the depicted embodiments are exemplary, other embodiments would be readily apparent to those skilled in the art.

Figure 7D:
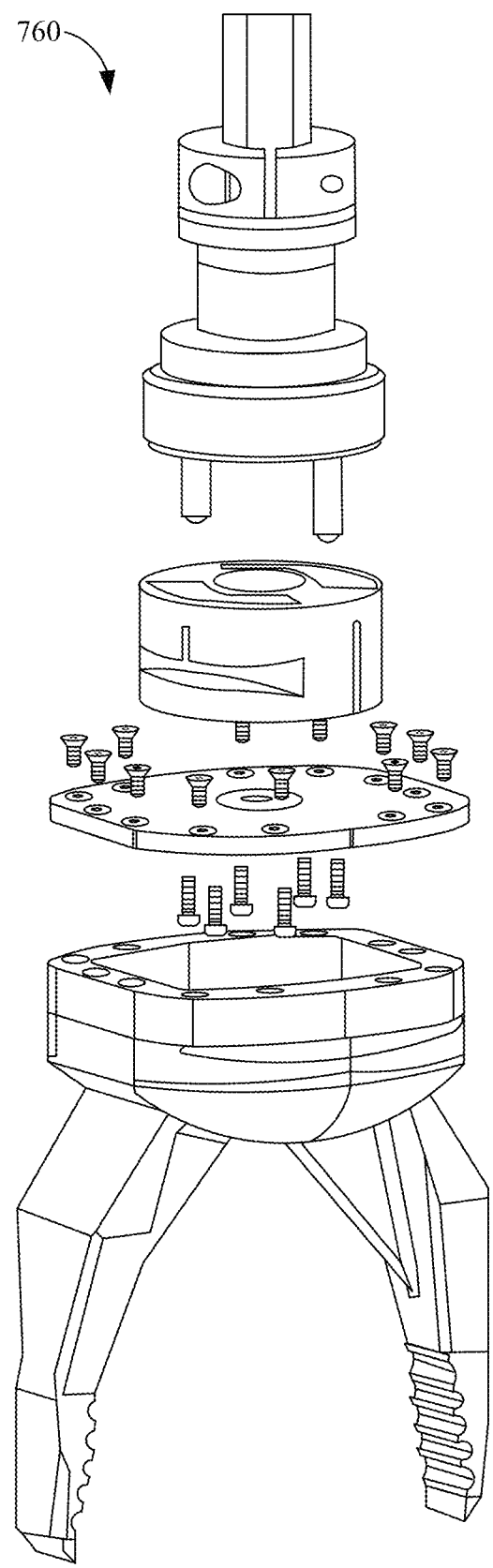
FIG. 7D shows an exploded view of various components of an example soft picking tool for a pick, sort, and place robotic system, in accordance with one embodiment of the invention.

FIG. 7D shows an exploded view 760 of various components of an example soft picking tool for a pick, sort, and place robotic system, in accordance with one embodiment of the invention.

Figure 8A:
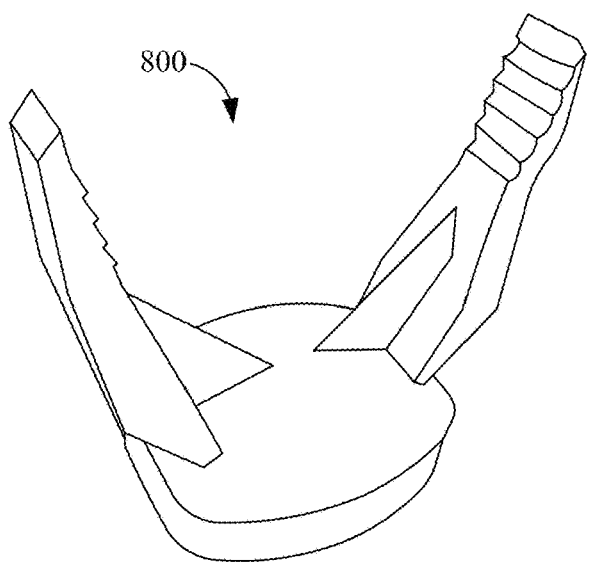
FIGS. 8A, 8B, and 8C show images based on various photographs of an example soft picking tool for a pick, sort, and place robotic system, in accordance with various embodiments of the invention.
Figure 8B:
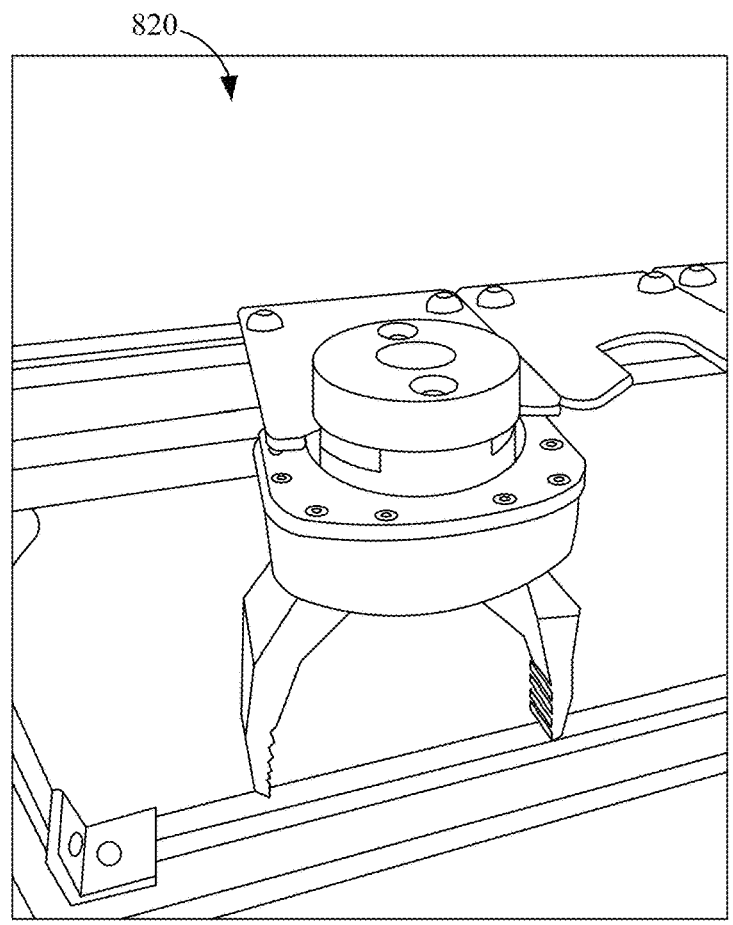
Figure 8C:
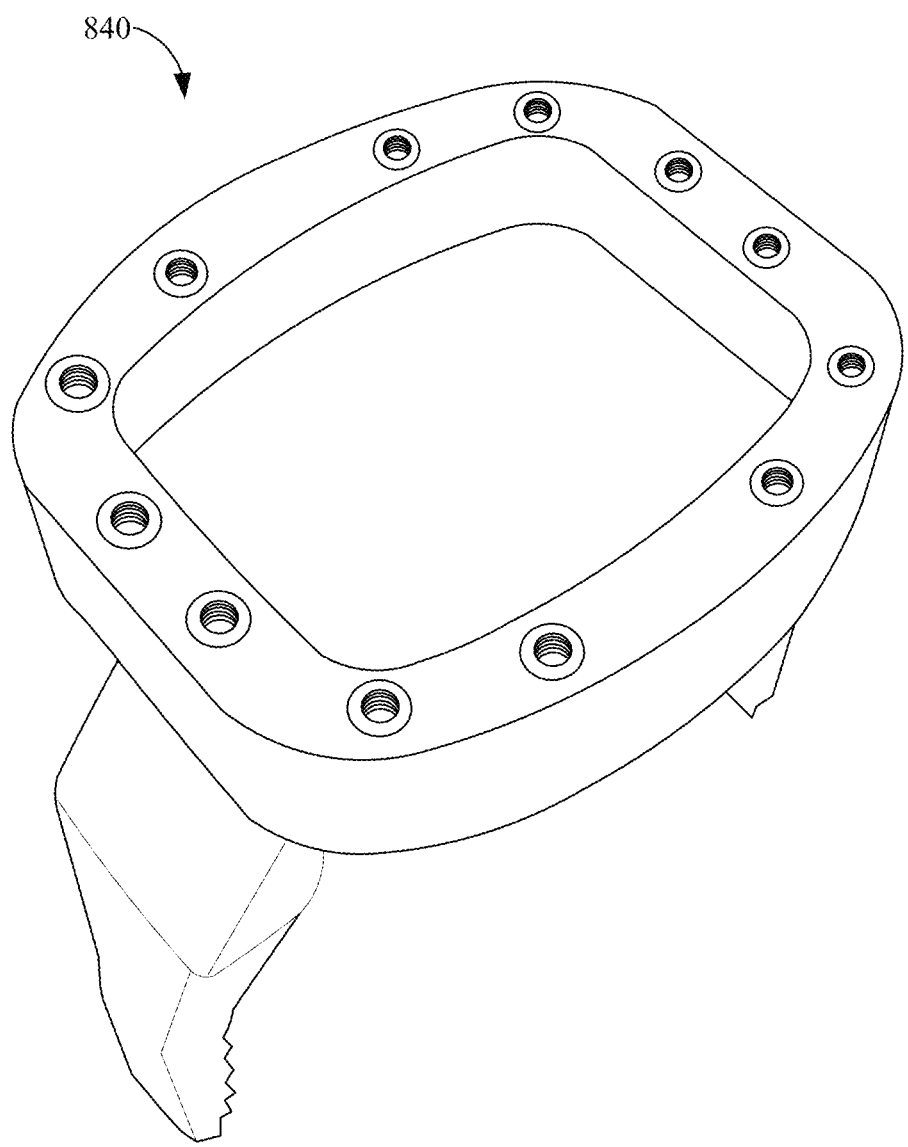

FIGS. 8A, 8B, and 8C show images 800, 820, and 840 based on various photographs of an example soft picking tool for a pick, sort, and place robotic system, in accordance with various embodiments of the invention. In some embodiments, the soft picking tool 206 includes one or more sensors, which is part of a sensor system configured to determine the position of one or more stiff fingers, the position of an object relative to the soft picking tool, or the force level applied by one or more stiff fingers. The one or more sensors may be pressure sensors, force sensors, proximity sensors, electric current sensors, magnetic field sensors, or visual sensors (e.g., cameras).

In some embodiments, the soft picking tool 206 is part of a robotic system 100 that includes a feedback mechanism that uses vacuum back pressure or other means to determine whether the stiff fingers have held onto a load or not. In some embodiments, the feedback mechanism determines how strong the hold is. A plurality of vision sensors, tactile sensors, or pressure sensors may be used for such purposes. For example, the feedback mechanism may include of an RGB camera directed at the gripper to visually detect whether the gripper has held onto a load or not. In some embodiments, the robotic system 100 may include information regarding the gripping pressure ranges for holding onto objects of various types. For example, fragile objects may have a low threshold for acceptable gripping pressures beyond which a gripping tool would damage or break the object; heavy objects may have a high threshold for acceptable gripping pressures below which a gripping tool would be unable to grip the object. In some embodiments, an artificial intelligence (AI) system trained on the feedback mechanism, the system is configured to detect anomalous behavior, such as double picking or a weak grip. In some embodiments, a machine learning module determines the position of one or more of the stiff fingers, the position of an object relative to the soft picking tool, or a force level applied by one or more of the stiff fingers. In some embodiments, a pressure sent to the soft picking tool adjusts in response to the determined information in order to achieve a particular goal, such as gripping an object within a pre-determined pressure range or making contact with an object.

In some embodiments, the end effector may include more than one soft picking tool, where the multiple soft picking tools may act in a coordinated manner. Such an arrangement may be used, for example, to grip a long object with stability and force that is impossible or difficult to achieve with a single soft picking tool, the equivalent of a human holding a long item with both hands. The arrangement of multiple soft picking tools may also be configured to grip an object with a specific shape. In some embodiments, such combined tools share the same end effector but have separate bodies. An air valve connector located at the proximal end of the tools' adapter plates may be configured to apply a fixed proportion of the total applied pressure to each soft picking tool (e.g., 50% in the case of two soft identical picking tools configured to apply the same force at all times). The tools sharing the same end effector may also share one tool changer (i.e., the air valve is located between the adapter plates and the tool changer in FIGS. 3A and 3B). In this configuration, the group of tools combined in this manner are considered by the robotic system 100 to be the same tool.

In another embodiment, the air valve connector is located at the proximal end of the tools' upper tool changers. In this configuration, each of the tools combined in this manner are considered by the robotic system 100 to be a separate tool. In yet other embodiments, separate vacuum tubes may be used for each of the soft picking tools located on the same robotic arm.

Soft Picking Tool in Action

Figure 9A:
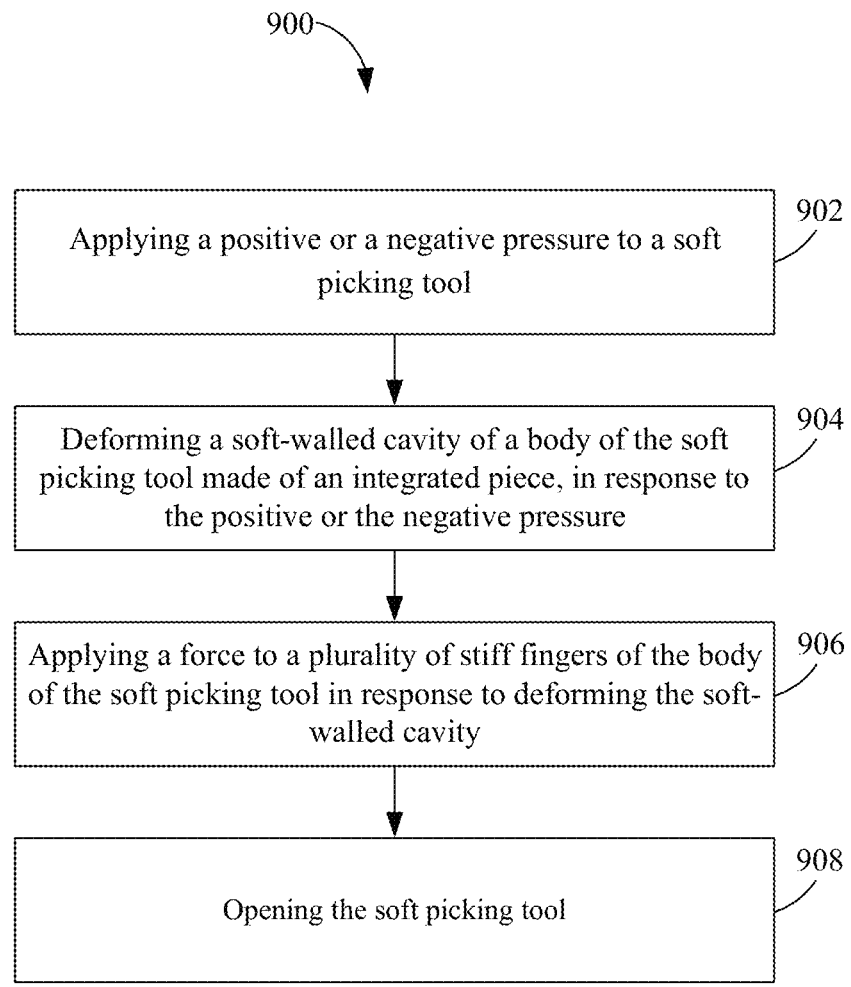
FIG. 9A shows an illustrative flow diagram for opening a soft picking tool for a pick, sort, and place robotic system, in accordance with one embodiment of the invention.

FIG. 9A shows an illustrative flow diagram 900 for opening a soft picking tool for a pick, sort, and place robotic system, in accordance with one embodiment of the invention. Flow diagram 900 begins at step 902 by applying a positive pressure or a negative pressure to the soft picking tool. In step 904, a soft-walled cavity of a body of the soft picking tool made of an integrated piece, is deformed in response to the positive pressure or the negative pressure. In step 906, a force is applied to a plurality of stiff fingers of the body of the soft picking tool in response to deforming the soft-walled cavity. In step 908, the movement of the plurality of stiff fingers opens the soft picking tool.

Figure 9B:
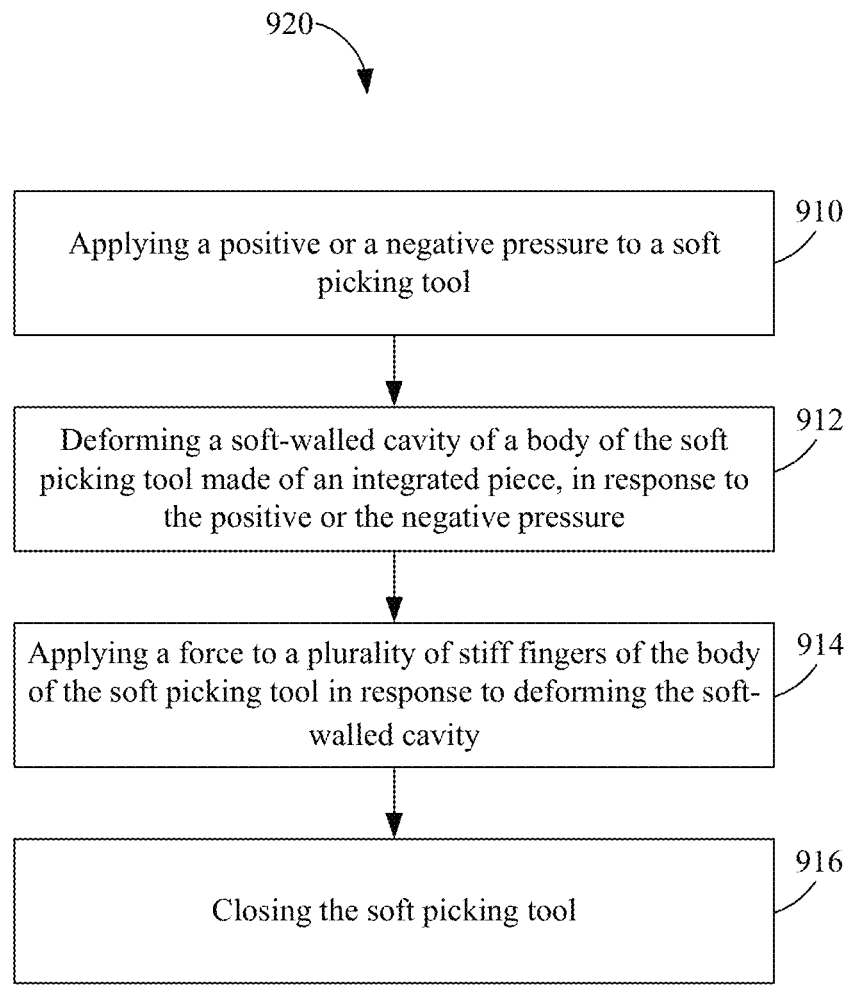
FIG. 9B shows an illustrative flow diagram for closing a soft picking tool for a pick, sort, and place robotic system, in accordance with one embodiment of the invention.

FIG. 9B shows an illustrative flow diagram 920 for closing a soft picking tool for a pick, sort, and place robotic system, in accordance with one embodiment of the invention. Flow diagram 920 begins at step 910 by applying a positive pressure or a negative pressure to the soft picking tool. In step 912, a soft-walled cavity of a body of the soft picking tool made of an integrated piece, is deformed in response to the positive pressure or the negative pressure. In step 914, a force is applied to a plurality of stiff fingers of the body of the soft picking tool in response to deforming the soft-walled cavity. In step 916, the movement of the plurality of fingers closes the soft picking tool.

Flow diagrams demonstrating a combination of motions for multiple soft picking tools would be apparent to those skilled in the art.

Exemplary System Architecture

An exemplary embodiment of the present disclosure may include one or more servers (management computing entities), one or more networks, and one or more clients (user computing entities). For example, a server device may be used to remotely control the pick and place robotic system from a remote location, and a client device may be used to remotely monitor the operations of the robotic system. Similarly, various computing components of the robotic system may be implemented using either the server or client device architecture described herein. Each of these components, entities, devices, and systems (similar terms used herein interchangeably) may be in direct or indirect communication with, for example, one another over the same or different wired or wireless networks. Additionally, while FIGS. 10 and 11 illustrate the various system entities as separate, standalone entities, the various embodiments are not limited to this particular architecture.

Exemplary Management Computing Entity

Figure 10:
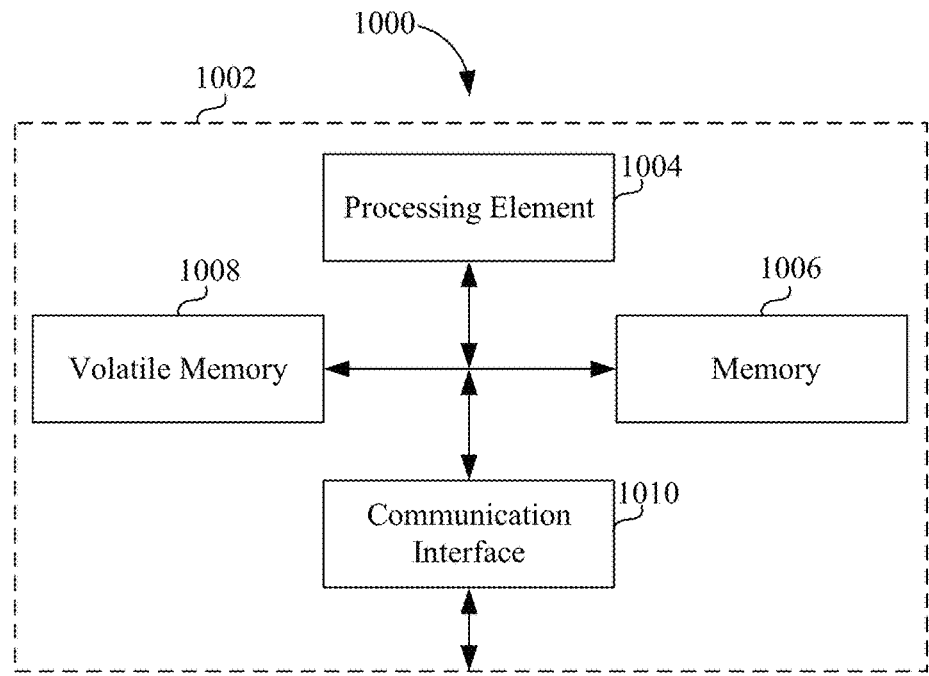
FIG. 10 provides a block diagram of a server (management computing entity) according to one embodiment of the present invention.
Figure 11:
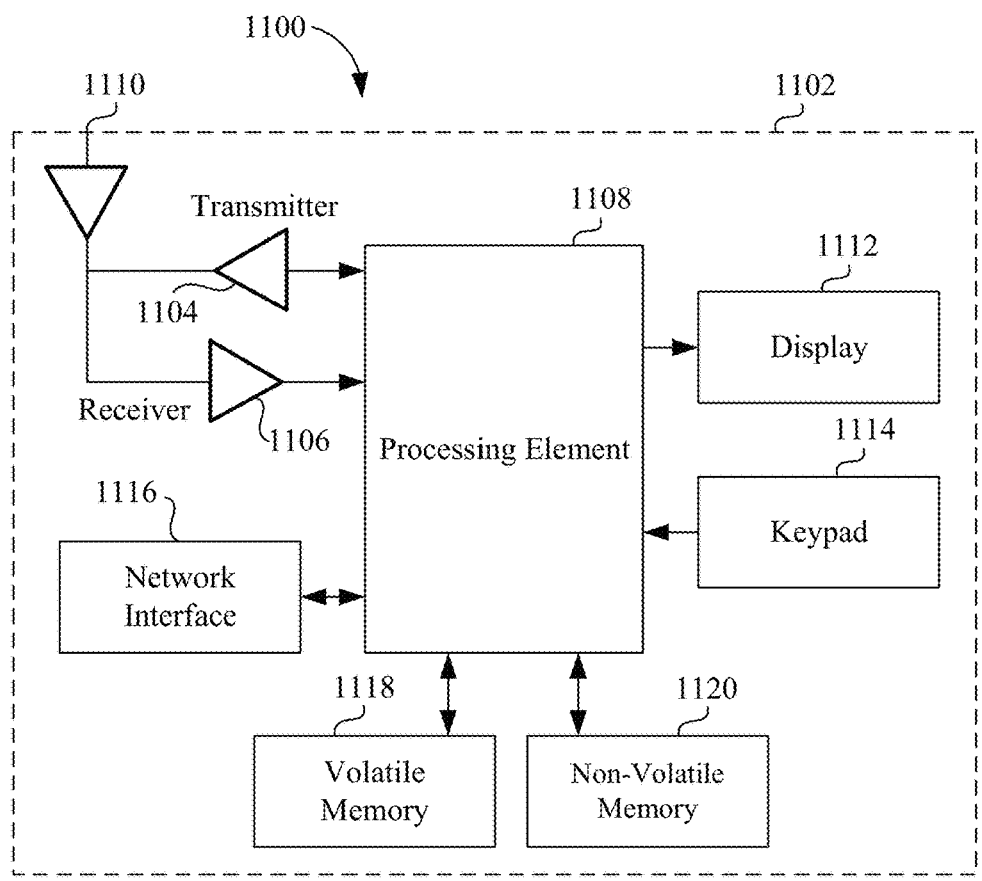
FIG. 11 provides an illustrative schematic representative of a client (user computing entity) that can be used in conjunction with embodiments of the present invention.

FIG. 10 provides a block diagram 1000 of a server (management computing entity 1002) according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably).

As indicated, in one embodiment, the management computing entity 1002 may also include one or more communications interfaces 1010 for communicating with various computing entities, such as by communicating data, content, and/or information (similar terms used herein interchangeably) that can be transmitted, received, operated on, processed, displayed, stored, and/or the like.

As shown in FIG. 10, in one embodiment, the management computing entity 1002 may include or be in communication with one or more processing elements 1004 (also referred to as processors and/or processing circuitry—similar terms used herein interchangeably) that communicate with other elements within the management computing entity 1002 via a bus, for example. As will be understood, the processing element 1004 may be embodied in a number of different ways. For example, the processing element 1004 may be embodied as one or more complex programmable logic devices (CPLDs), microprocessors, multi-core processors, coprocessing entities, application-specific instruction-set processors (ASIPs), microcontrollers, and/or controllers. Further, the processing element 1004 may be embodied as one or more other processing devices or circuitry. The term circuitry may refer to an entire hardware embodiment or a combination of hardware and computer program products. Thus, the processing element 1004 may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processing element 1004 may be configured for a particular use or configured to execute instructions stored in volatile or non-volatile media or otherwise accessible to the processing element 1004. As such, whether configured by hardware or computer program products, or by a combination thereof, the processing element 1004 may be capable of performing steps or operations according to embodiments of the present disclosure when configured accordingly.

In one embodiment, the management computing entity 1002 may further include or be in communication with non-volatile media (also referred to as non-volatile storage, memory, memory storage, and/or memory circuitry—similar terms used herein interchangeably). In one embodiment, the non-volatile storage or memory may include one or more non-volatile storage or memory media 1006, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 1002 may further include or be in communication with volatile media (also referred to as volatile storage, memory, memory storage, memory and/or circuitry—similar terms used herein interchangeably). In one embodiment, the volatile storage or memory may also include one or more volatile storage or memory media 1008, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 1004. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 1002 with the assistance of the processing element 1004 and operating system.

As indicated, in one embodiment, the management computing entity 1002 may also include one or more communications interfaces 1010 for communicating with various computing entities, such as by communicating data, content, and/or information (similar terms used herein interchangeably) that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 1002 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 1002 may include or be in communication with one or more input elements, such as a keyboard input, a mouse input, a touch screen/display input, motion input, movement input, audio input, pointing device input, joystick input, keypad input, and/or the like. The management computing entity 1002 may also include or be in communication with one or more output elements (not shown), such as audio output, video output, screen/display output, motion output, movement output, and/or the like.

As will be appreciated, one or more of the components of the management computing entity 1002 may be located remotely from other management computing entity 1002 components, such as in a distributed system. Furthermore, one or more of the components may be combined and additional components performing functions described herein may be included in the management computing entity 1002. Thus, the management computing entity 1002 can be adapted to accommodate a variety of needs and circumstances. As will be recognized, these architectures and descriptions are provided for exemplary purposes only and are not limiting to the various embodiments.

Exemplary User Computing Entity

A user may be an individual, a company, an organization, an entity, a department within an organization, a representative of an organization and/or person, and/or the like. FIG. 11 provides an illustrative schematic representative 1100 of a client (user computing entity) 1102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 1102 can be operated by various parties. As shown in FIG. 11, the user computing entity 1102 can include an antenna 1110, a transmitter 1104 (e.g., radio), a receiver 1106 (e.g., radio), and a processing element 1108 (e.g., CPLDs, microprocessors, multi-core processors, coprocessing entities, ASIPs, microcontrollers, and/or controllers) that provides signals to and receives signals from the transmitter 1104 and receiver 1106, respectively.

The signals provided to and received from the transmitter 1104 and the receiver 1106, respectively, may include signaling information in accordance with air interface standards of applicable wireless systems. In this regard, the user computing entity 1102 may be capable of operating with one or more air interface standards, communication protocols, modulation types, and access types. More particularly, the user computing entity 1102 may operate in accordance with any of a number of wireless communication standards and protocols, such as those described above with regard to the management computing entity 1002. In a particular embodiment, the user computing entity 1102 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 1102 may operate in accordance with multiple wired communication standards and protocols, such as those described above with regard to the management computing entity 1002 via a network interface 1116.

Via these communication standards and protocols, the user computing entity 1102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 1102 can also download changes, add-ons, and updates, for instance, to its firmware, software (e.g., including executable instructions, applications, program modules), and operating system.

According to one embodiment, the user computing entity 1102 may include location determining aspects, devices, modules, functionalities, and/or similar words used herein interchangeably. For example, the user computing entity 1102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 1102 position in connection with a variety of other systems, including cellular towers, Wi-Fi access points, and/or the like. Similarly, the user computing entity 1102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 1102 may also comprise a user interface (that can include a display 1112 coupled to a processing element 1108 and/or a user input interface (coupled to a processing element 1108. For example, the user interface may be a user application, browser, user interface, and/or similar words used herein interchangeably executing on and/or accessible via the user computing entity 1102 to interact with and/or cause display of information from the management computing entity 1002, as described herein. The user input interface can comprise any of a number of devices or interfaces allowing the user computing entity 1102 to receive data, such as a keypad 1114 (hard or soft), a touch display 1112, voice/speech or motion interfaces, or other input device. In embodiments including a keypad 1114, the keypad 1114 can include (or cause display of) the conventional numeric (0-9) and related keys (#, *), and other keys used for operating the user computing entity 1102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 1102 can also include volatile storage or memory 1118 and/or non-volatile storage or memory 1120, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 1102. As indicated, this may include a user application that is resident on the entity or accessible through a browser or other user interface for communicating with the management computing entity 1002 and/or various other computing entities.

In another embodiment, the user computing entity 1102 may include one or more components or functionality that are the same or similar to those of the management computing entity 1002, as described in greater detail above. As will be recognized, these architectures and descriptions are provided for exemplary purposes only and are not limiting to the various embodiments.

Figure 12:
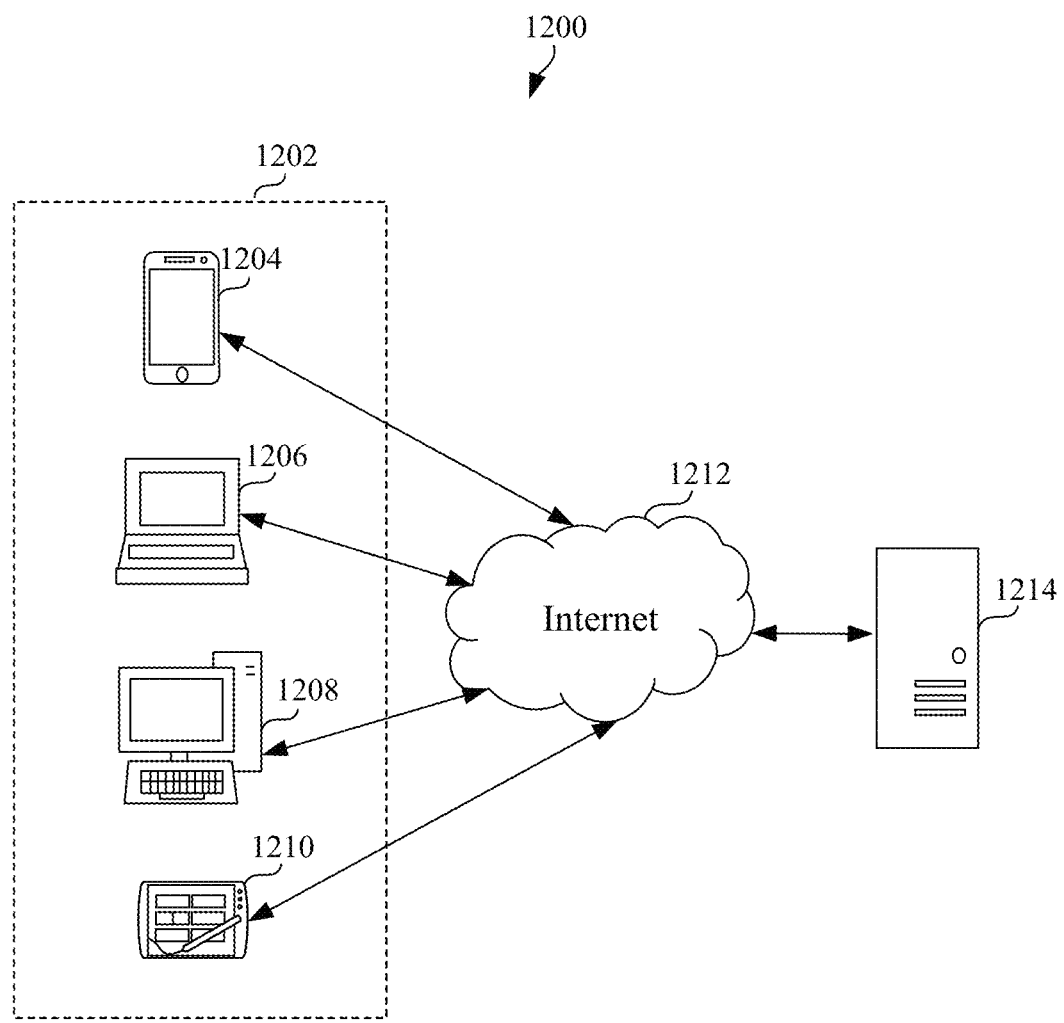
FIG. 12 shows an illustrative system architecture diagram for implementing one embodiment of the present invention in a client-server environment.

The present invention may be implemented in a client server environment. FIG. 12 shows an illustrative system architecture 1200 for implementing one embodiment of the present invention in a client server environment. User devices 1202 on the client side may include smart phones 1204, laptops 1206, desktop PCs 1208, tablets 1210, or other devices. Such user devices 1202 access the service of the system server 1214 through some network connection 1212, such as the Internet.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap to practice the methods of the present invention.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A soft picking tool for a pick and place robotic system, comprising:
   a body made of an integrated piece, the body comprising:
      a plurality of stiff fingers located on a distal end of the body, and
      a portion of a single soft-walled cavity configured to be deformed by application of a positive or negative pressure in the single soft-walled cavity, leading to a motion of the plurality of stiff fingers in response to the deformation of the single soft-walled cavity, from a rest position, towards or away from a medial axis of the soft picking tool;
   one or more embedded fingertips, wherein at least one of the plurality of stiff fingers comprises an embedded fingertip embedded on its distal end;
   an adapter plate that seals a proximal end of the single soft-walled cavity, the adapter plate comprising an adapter plate medial channel; and
   an embedded mounting ring attaching the body to the adapter plate.

2. The soft picking tool of claim 1, further comprising:
   a lower part of a tool changer attached to the adapter plate, wherein the lower part of the tool changer connects to the pick and place robotic system through an upper part of the tool changer, and
   wherein the lower part of the tool changer comprises a tool changer medial channel aligned with the adapter plate medial channel.

3. The soft picking tool of claim 2,
   wherein the plurality of stiff fingers is a set of two stiff fingers,
   wherein the two stiff fingers are placed along a lateral axis perpendicular to the medial axis of the soft picking tool, and
   wherein the motion of the two stiff fingers is a rotation around a frontal axis perpendicular to both the lateral axis and the medial axis of the soft picking tool.

4. The soft picking tool of claim 3, wherein the body, the embedded mounting ring, and the adapter plate are narrower along the frontal axis than along the lateral axis.

5. The soft picking tool of claim 1, wherein a number of and a spatial arrangement of stiff fingers in the plurality of stiff fingers is configured to grip a specifically shaped object.

6. The soft picking tool of claim 1, wherein the single soft-walled cavity is hemispherical.

7. The soft picking tool of claim 1, wherein the single soft-walled cavity is paraboloidal.

8. The soft picking tool of claim 1, wherein the single soft-walled cavity is ellipsoidal.

9. The soft picking tool of claim 1, wherein the one or more embedded fingertips are detachable.

10. The soft picking tool of claim 1, wherein each of the plurality of stiff fingers is configured to not touch another of the plurality of stiff fingers at any level of pressure applied inside the single soft-walled cavity.

11. The soft picking tool of claim 1, wherein one of the plurality of stiff fingers is configured to touch another of the plurality of stiff fingers at some level of pressure applied inside the single soft- walled cavity.

12. The soft picking tool of claim 1, wherein a plurality of levels of pressure applied inside the single soft-walled cavity leads to a plurality of corresponding levels of force applied by each of the plurality of stiff fingers on an object.

13. The soft picking tool of claim 1, wherein the motion of the plurality of stiff fingers from the rest position is a gripping motion that occurs only towards the medial axis of the soft picking tool.

14. The soft picking tool of claim 1, wherein the motion of the plurality of stiff fingers from the rest position is a spreading motion that occurs only away from the medial axis of the soft picking tool.

15. The soft picking tool of claim 1, further comprising:
an external valve that is configured to maintain a pressure level inside the s single oft-walled cavity.

16. The soft picking tool of claim 1, further comprising:
a sensor for determining information selected from the group consisting of a position of one or more of the plurality of stiff fingers, a position of an object relative to the soft picking tool, and a force level applied by one or more of the plurality of stiff fingers of the soft picking tool.

17. The soft picking tool of claim 16, wherein the sensor is selected from the group consisting of a pressure sensor, a force sensor, a proximity sensor, an electric current sensor, and a camera.

18. The soft picking tool of claim 16, wherein a pressure sent to the soft picking tool adjusts in response to the information determined from the sensor to maintain a force level applied by one or more of the plurality of stiff fingers of the soft picking tool within a pre-determined force range.

19. The soft picking tool of claim 18, wherein the pre-determined force range corresponds to gripping an object without damaging the object.

20. The soft picking tool of claim 16, further comprising:
a machine learning module for determining information selected from the group consisting of a position of one or more of the plurality of stiff fingers, a position of an object relative to the soft picking tool, and a force level applied by one or more of the plurality of stiff fingers.

21. A pick and place robotic system, comprising:
a soft picking tool, comprising:
a body made of an integrated piece, the body comprising:
a plurality of stiff fingers located on a distal end of the body, and
a portion of a single soft-walled cavity configured to be deformed by application of a positive or negative pressure in the single soft-walled cavity, leading to a motion of the plurality of stiff fingers in response to the deformation of the single soft-walled cavity, from a rest position, towards or away from a medial axis of the soft picking tool; and
one or more embedded fingertips, wherein at least one of the plurality of stiff fingers comprises an embedded fingertip embedded on its distal end, and wherein each of the plurality of stiff fingers is configured to not touch another of the plurality of stiff fingers at any level of pressure applied inside the single soft-walled cavity.

22. A soft picking tool for a pick and place robotic system, comprising:
a body made of an integrated piece, the body comprising:
a plurality of stiff fingers located on a distal end of the body, and
a portion of a single soft-walled cavity configured to be deformed by application of a positive or negative pressure in the single soft-walled cavity, leading to a motion of the plurality of stiff fingers in response to the deformation of the single soft-walled cavity, from a rest position, towards or away from a medial axis of the soft picking tool; and
one or more embedded fingertips, wherein at least one of the plurality of stiff fingers comprises an embedded fingertip embedded on its distal end, and wherein the motion of the plurality of stiff fingers from the rest position is a gripping motion that occurs only towards the medial axis of the soft picking tool.

\* \* \* \* \*